US010421400B2

(12) United States Patent
Imaizumi et al.

(10) Patent No.: US 10,421,400 B2
(45) Date of Patent: Sep. 24, 2019

(54) SURROUNDINGS MONITORING SYSTEM FOR WORK VEHICLE, WORK VEHICLE, AND SURROUNDINGS MONITORING METHOD FOR WORK VEHICLE

(71) Applicant: Komatsu Ltd., Tokyo (JP)

(72) Inventors: Masaaki Imaizumi, Tokyo (JP); Takeshi Kurihara, Tokyo (JP); Masataka Ozaki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/535,808

(22) PCT Filed: Feb. 9, 2017

(86) PCT No.: PCT/JP2017/004807
§ 371 (c)(1),
(2) Date: Jun. 14, 2017

(87) PCT Pub. No.: WO2017/131243
PCT Pub. Date: Aug. 3, 2017

(65) Prior Publication Data
US 2018/0222390 A1    Aug. 9, 2018

(51) Int. Cl.
*B60R 1/00* (2006.01)
*E02F 9/24* (2006.01)
(Continued)

(52) U.S. Cl.
CPC .................. *B60R 1/00* (2013.01); *E02F 9/24* (2013.01); *E02F 9/26* (2013.01); *H04N 7/18* (2013.01);
(Continued)

(58) Field of Classification Search
CPC ................ B60R 1/00; B60R 2300/105; B60R 2300/802; B60R 2300/607; E02F 9/24; H04N 7/181
See application file for complete search history.

(56) References Cited

U.S. PATENT DOCUMENTS

2010/0171828 A1   7/2010  Ishii
2013/0147958 A1   6/2013  Mitsuta et al.
(Continued)

FOREIGN PATENT DOCUMENTS

CN    103649426 A    3/2014
EP     2181898 A1    5/2010
(Continued)

OTHER PUBLICATIONS

Supplementary European Search Report dated Dec. 11, 2017, issued for the European patent application No. 17727786.0.
(Continued)

*Primary Examiner* — Tung T Vo
*Assistant Examiner* — Joseph W Becker
(74) *Attorney, Agent, or Firm* — Locke Lord LLP

(57) ABSTRACT

A surroundings monitoring system for a work vehicle includes a bending angle data acquirer acquiring bending angle data between a vehicle body front and rear portions, and a shot image data acquirer acquiring shot images respectively shot by multiple cameras, and a bird's eye image compositor performing image processing of a plurality of the shot image data to generate a bird's eye image, and a storage storing representative images of the work vehicle respectively belong to multiple bending angle ranges between the vehicle body front and rear portions, and a determiner determining, from the multiple bending angle ranges, a bending angle range to which the bending angle belongs, and a selector selecting, from a plurality of the (Continued)

representative images, a representative image that belongs to the determined bending angle range, and a display controller causing a display to simultaneously display the generated bird's eye image and the selected representative image.

8 Claims, 22 Drawing Sheets

(51) Int. Cl.
*E02F 9/26* (2006.01)
*H04N 7/18* (2006.01)

(52) U.S. Cl.
CPC ........ *H04N 7/181* (2013.01); *B60R 2300/105* (2013.01); *B60R 2300/607* (2013.01); *B60R 2300/802* (2013.01)

(56) References Cited

U.S. PATENT DOCUMENTS

2014/0088824 A1　3/2014　Ishimoto
2014/0118533 A1　5/2014　Chang
2016/0212352 A1　7/2016　Sanchez et al.
2017/0178512 A1*　6/2017　Kannon .................... B60R 1/00

FOREIGN PATENT DOCUMENTS

| | | |
|---|---|---|
| EP | 2712969 A1 | 4/2014 |
| JP | 2003-235036 A | 8/2003 |
| JP | 2009-060499 A | 3/2009 |
| JP | 2012-105158 A | 5/2012 |
| WO | 2012/157379 A1 | 11/2012 |
| WO | 2012/169352 A1 | 12/2012 |

OTHER PUBLICATIONS

International Search Report dated Apr. 25, 2017, issued for PCT/JP2017/004807.
Communication under Rule 71(3) EPC dated Aug. 30, 2018, issued for the corresponding European patent application No. 17 727 786.0.

* cited by examiner

RIGHT OUTER BENDING ANGLE RANGE FRro
(+35[°]<Θ)

LEFT OUTER BENDING ANGLE RANGE FRlo
($\theta < -35[°]$)

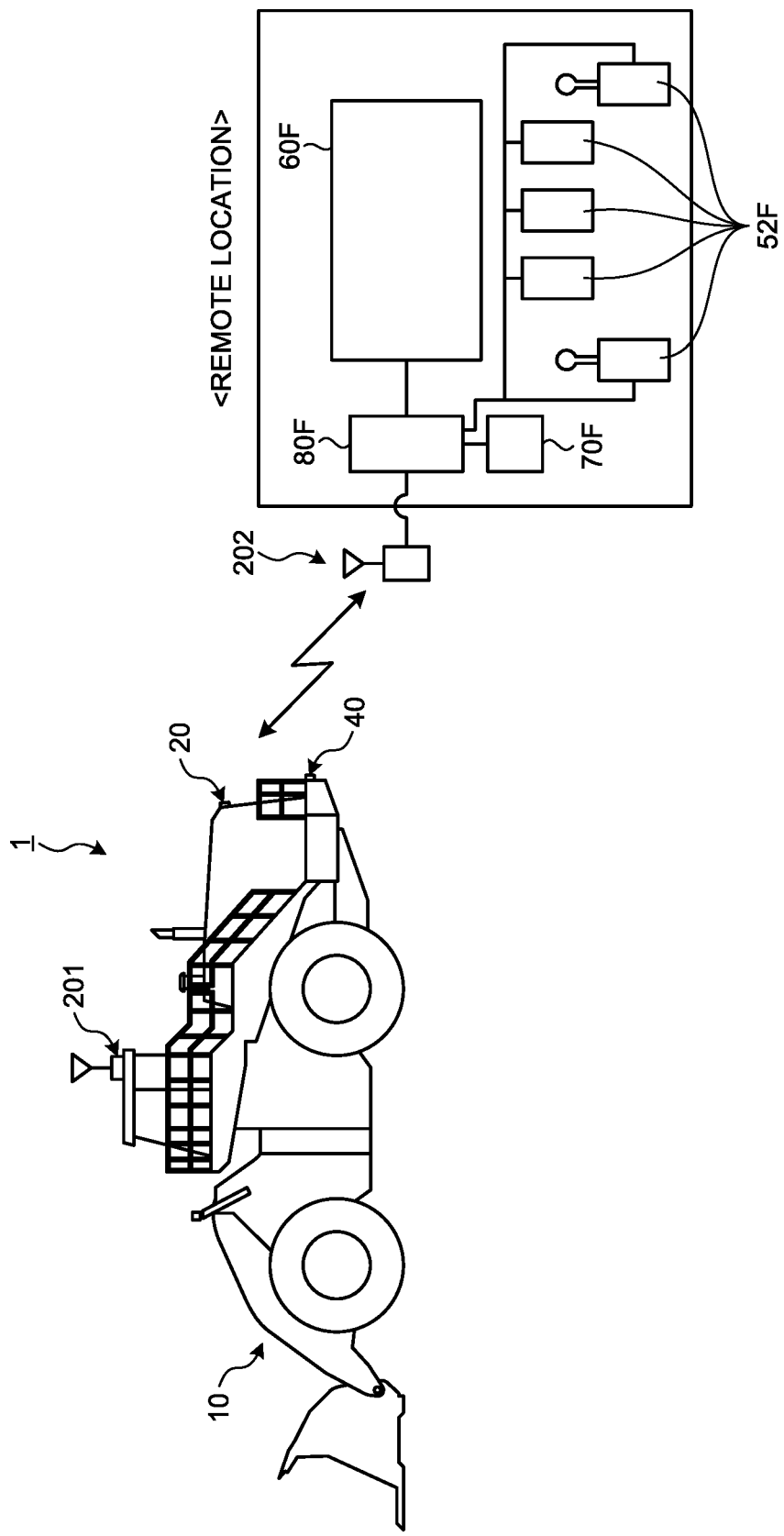

SURROUNDINGS MONITORING SYSTEM FOR WORK VEHICLE, WORK VEHICLE, AND SURROUNDINGS MONITORING METHOD FOR WORK VEHICLE

FIELD

The present invention relates to a surroundings monitoring system for a work vehicle, a work vehicle, and a surroundings monitoring method for a work vehicle.

BACKGROUND

In a technological field pertaining to work vehicles, a surroundings monitoring system has been known with which surroundings of a work vehicle are monitored, such as that disclosed in Patent Literature 1.

CITATION LIST

Patent Literature

Patent Literature 1: WO 2012/157379 A

SUMMARY

Technical Problem

A surroundings monitoring system generates a bird's eye image of surroundings of a work vehicle and causes a display device provided in an operator's cabin of the work vehicle to display the bird's eye image. By the bird's eye image displayed on the display device, an operator of the work vehicle can accurately recognize relative positions of the work vehicle and an obstacle in the surroundings of the work vehicle. In a case of an articulated work vehicle such as a wheel loader or an articulated dump truck, an operator can accurately recognize relative positions of the articulated work vehicle and an obstacle when it is possible to cause a display device to display an image which indicates a bent state of the articulated work vehicle. However, in a case where an image which indicates a bent state of an articulated work vehicle is generated each time when a bending angle of the articulated work vehicle is changed, a load of image processing increases. Accordingly, an image processing device with high performance is required for a surroundings monitoring system. As a result, there is the potential for an increase in cost of the surroundings monitoring system. In addition, in a case where an image which indicates a bent state of the articulated work vehicle to be displayed on the display device is changed each time when a bending angle of the articulated work vehicle is changed, it is more likely that the image displayed on the display device flickers. As a result, visibility is deteriorated, which makes it difficult for the operator to accurately recognize relative positions of the articulated work vehicle and an obstacle.

An object of an aspect of the present invention is to let an operator accurately recognize relative positions of an articulated work vehicle and an obstacle while suppressing an increase in cost.

Solution to Problem

According to a first aspect of the present invention, a surroundings monitoring system for a work vehicle that comprises a vehicle body front portion, a vehicle body rear portion, and a joint mechanism that bendably couples the vehicle body front portion and the vehicle body rear portion, the surroundings monitoring system for a work vehicle comprises: a bending angle data acquisition unit that acquires bending angle data that indicates a bending angle between the vehicle body front portion and the vehicle body rear portion detected by a detector mounted on the work vehicle; a shot image data acquisition unit that acquires shot images respectively shot by multiple cameras mounted on the work vehicle; a bird's eye image composition unit that performs image processing of a plurality of the shot image data to generate a bird's eye image of surroundings of the work vehicle; a storage unit that stores representative images of the work vehicle respectively belong to multiple bending angle ranges between the vehicle body front portion and the vehicle body rear portion; a determination unit that determines, from the multiple bending angle ranges, a bending angle range to which the bending angle belongs; a selection unit that selects, from a plurality of the representative images, a representative image that belongs to the bending angle range determined by the determination unit; and a display control unit that causes a display device to simultaneously display the bird's eye image generated by the bird's eye image composition unit and the representative image selected by the selection unit.

According to a second aspect of the present invention, a work vehicle comprises the surroundings monitoring system for a work vehicle according to the first aspect.

According to a third aspect of the present invention, a surroundings monitoring method for a work vehicle in which a vehicle body front portion and a vehicle body rear portion are bendable, the surroundings monitoring method for a work vehicle comprises: storing representative images of the work vehicle respectively belong to multiple bending angle ranges between the vehicle body front portion and the vehicle body rear portion; acquiring bending angle data that indicates a bending angle between the vehicle body front portion and the vehicle body rear portion; acquiring a shot image in which surroundings of the work vehicle are shot; performing image processing of a plurality of the shot images to generate a bird's eye image of the surroundings of the work vehicle; determining, from the multiple bending angle ranges, a bending angle range to which the bending angle belongs; selecting, from a plurality of the representative images, a representative image that belongs to the determined bending angle range; and simultaneously displaying the bird's eye image and the selected representative image.

Advantageous Effects of Invention

According to an aspect of the present invention, it is possible to let an operator accurately recognize relative positions of an articulated work vehicle and an obstacle while suppressing an increase in cost.

BRIEF DESCRIPTION OF DRAWINGS

FIG. 23 is a view schematically illustrating an example of a work vehicle according to a second embodiment.

DESCRIPTION OF EMBODIMENTS

Hereinbelow, embodiments according to the present invention will be described with reference to the drawings. However, the present invention is not limited thereto. Components of the embodiments described below may be combined appropriately. There may be a case where some components are not used.

First Embodiment

[Outline of Wheel Loader]

Figure 1:
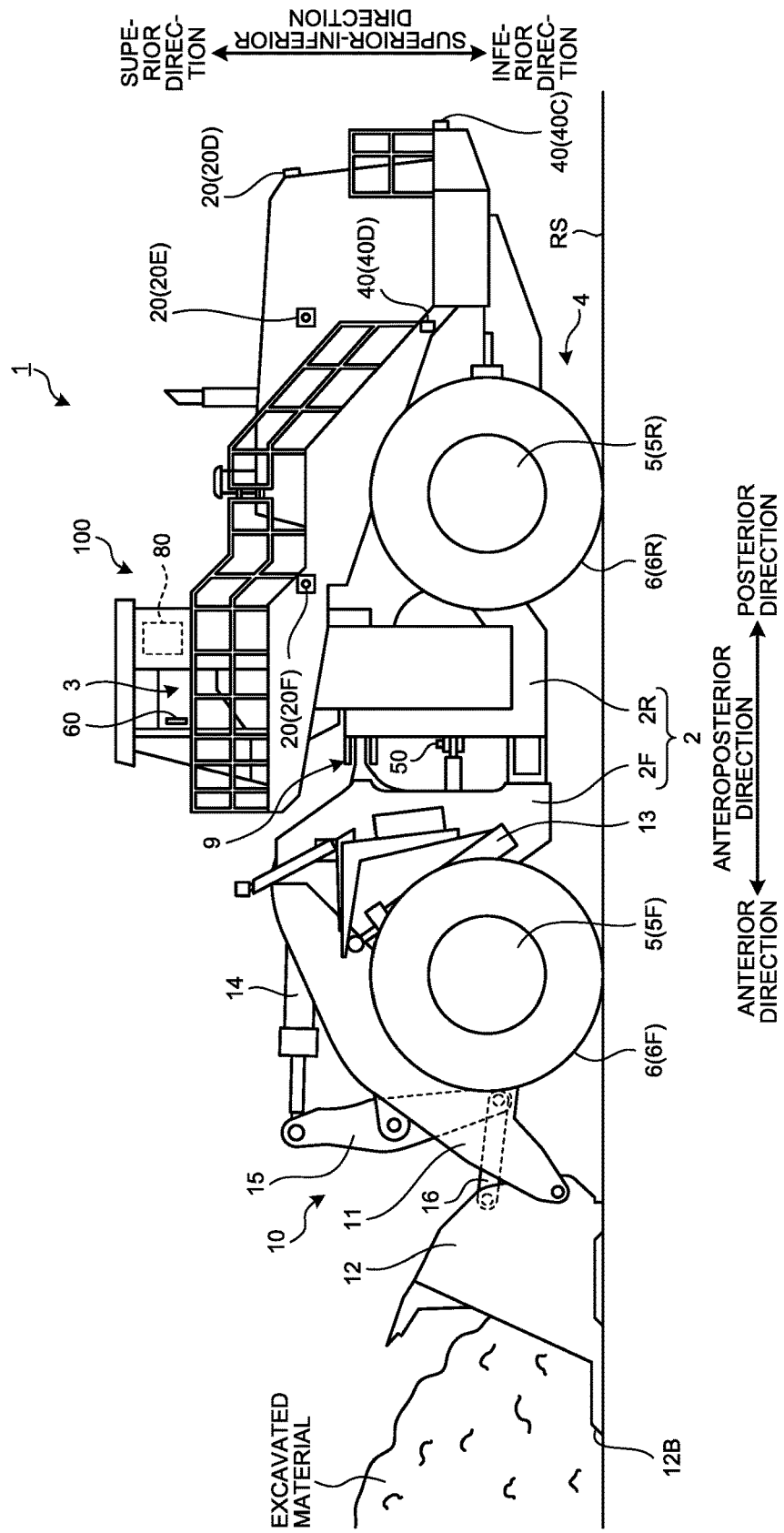
FIG. 1 is a side view illustrating an example of a work vehicle according to a first embodiment.
Figure 2:
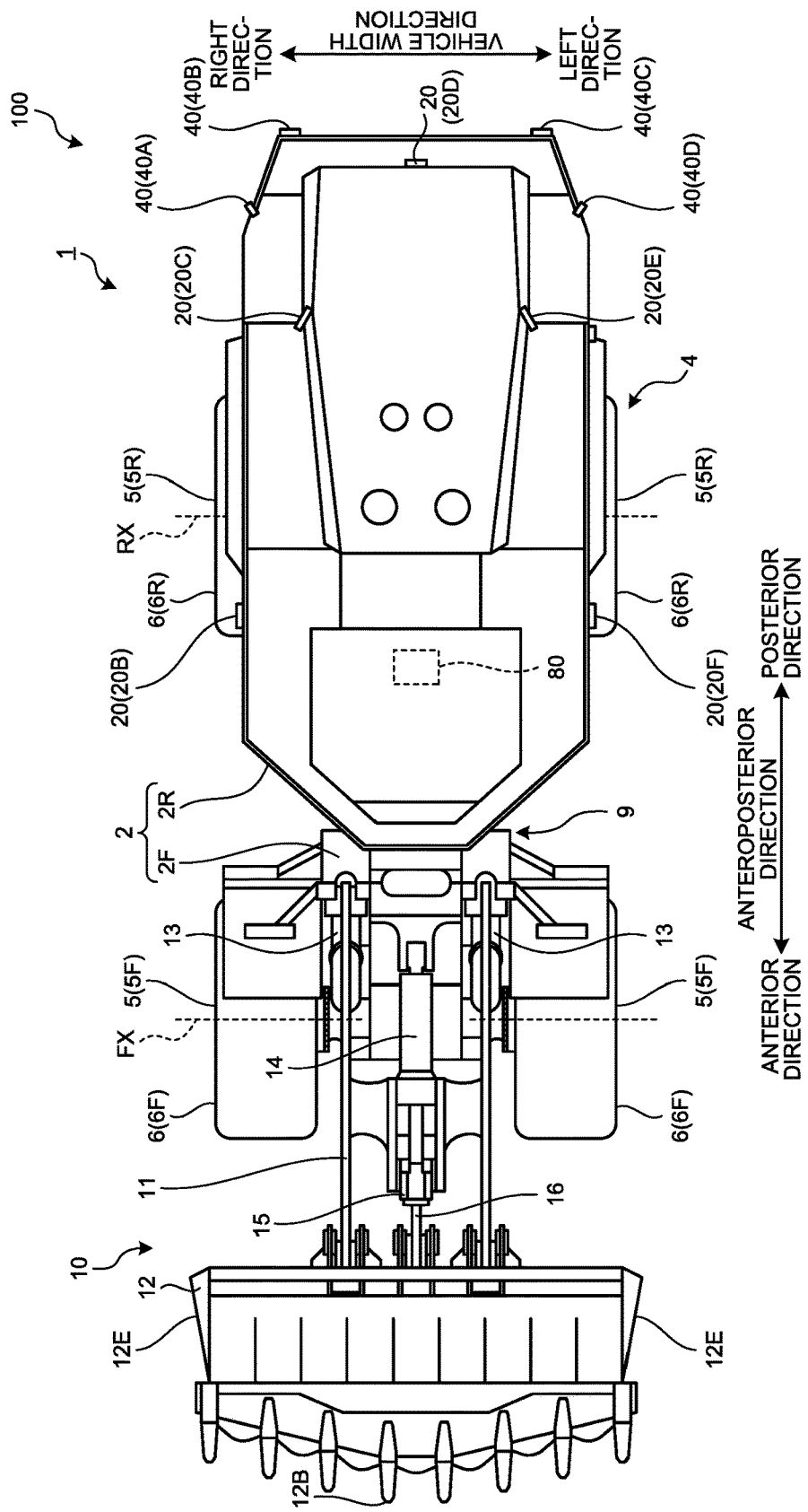
FIG. 2 is a top view illustrating the example of the work vehicle according to the first embodiment.
Figure 3:
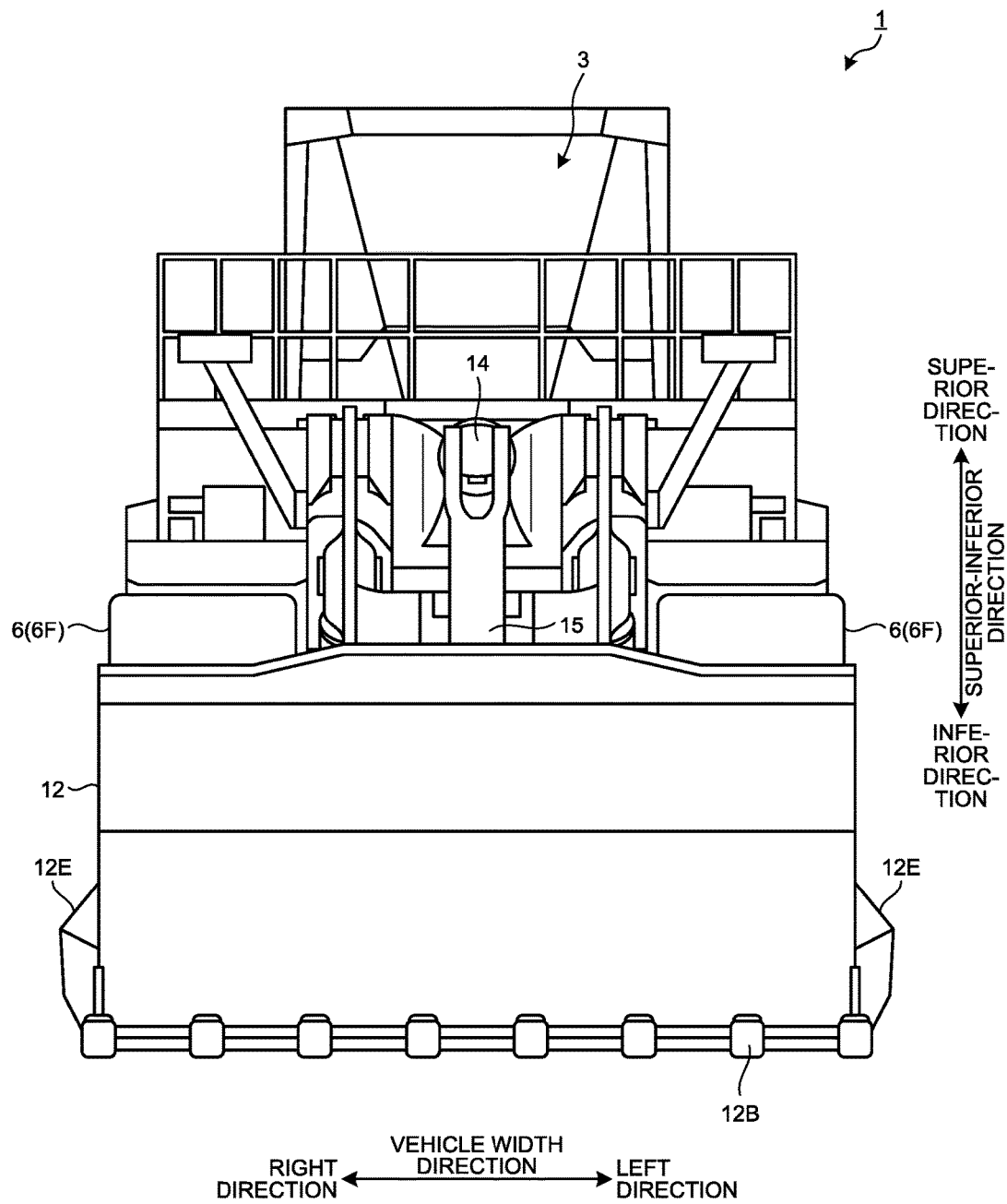
FIG. 3 is a front elevational view illustrating the example of the work vehicle according to the first embodiment.

A first embodiment will be described. FIG. 1 is a side view illustrating an example of a work vehicle 1 according to the present embodiment. FIG. 2 is a top view illustrating the example of the work vehicle 1 according to the present embodiment. FIG. 3 is a front elevational view illustrating the example of the work vehicle 1 according to the present embodiment. In the present embodiment, it is assumed that the work vehicle 1 is a wheel loader 1, which is a kind of articulated work vehicle. Furthermore, in the present embodiment, it is assumed that the wheel loader 1 operates in a mining site. The wheel loader 1 loads excavated material scooped with a bucket 12 into a vessel of a transport vehicle. For example, a dump truck is used as the transport vehicle. There may be a case where the wheel loader 1 discharges excavated material scooped with the bucket 12 to a discharge location provided at a predetermined place in a mine.

As illustrated in FIGS. 1, 2, and 3, the wheel loader 1 includes a vehicle body 2, an operation platform 3 on which an operator's seat is provided, a traveling device 4, and a working implement 10 supported by the vehicle body 2.

The vehicle body 2 includes a vehicle body front portion 2F and a vehicle body rear portion 2R. The vehicle body front portion 2F and the vehicle body rear portion 2R are bendably coupled via a joint mechanism 9. An angle sensor 50, which is a detector which detects a bending angle θ between the vehicle body front portion 2F and the vehicle body rear portion 2R, is provided in the joint mechanism 9. The joint mechanism 9 includes a pin member provided in one of the vehicle body front portion 2F and the vehicle body rear portion 2R, and a bearing member provided in another thereof. The angle sensor 50 is provided, for example, on the pin member.

The operation platform 3 is supported by the vehicle body 2. The wheel loader 1 is operated by an operator who mounts the operation platform 3. A driving operation device operated by the operator is arranged on the operation platform 3. The driving operation device includes, for example, an accelerator pedal, a brake pedal, a shift lever, a steering lever for swinging and steering the wheel loader 1, a forward/backward switch for performing switching between forward traveling and backward traveling of the wheel loader 1, and an operation lever for operating the working implement 10. The operator operates the driving operation device to perform adjustment of a traveling speed, switching between forward traveling and backward traveling, and swing of the wheel loader 1, and operation of the working implement 10.

The traveling device 4 supports the vehicle body 2. The traveling device 4 has wheels 5. The wheels 5 are rotated by power generated by an engine mounted on the vehicle body 2. Tires 6 are mounted to the wheels 5. The wheels 5 include two front wheels 5F supported by the vehicle body front portion 2F and two rear wheels 5R supported by the vehicle body rear portion 2R. The tires 6 include front tires 6F mounted to the front wheels 5F and rear tires 6R mounted to the rear wheels 5R. The traveling device 4 can travel on ground surface RS.

The front wheels 5F and the front tires 6F are rotatable about a rotation axis FX. The rear wheels 5R and the rear tires 6R are rotatable about a rotation axis RX.

In the following description, a direction in parallel with the rotation axis FX of the front tires 6F is appropriately referred to as a vehicle width direction, a direction perpendicular to ground-contacting surfaces of the front tires 6F which contact the ground surface RS is appropriately referred to as a superior-inferior direction, and a direction perpendicular to both of the vehicle width direction and the superior-inferior direction is appropriately referred to as an anteroposterior direction. When the vehicle body 2 of the wheel loader 1 travels in a straight line, the rotation axis FX and the rotation axis RX are in parallel with each other.

In the following description, a position or a direction close to the center of the vehicle body 2 in the vehicle width direction is appropriately referred to as an inside or an inward direction in the vehicle width direction, and a position or a direction away from the center of the vehicle body 2 is appropriately referred to as an outside or an outward direction in the vehicle width direction. In the vehicle width direction, one direction based on the operator's seat on the operation platform 3 is appropriately referred to as a right side or a right direction, and an opposite side or an opposite direction of the right side or the right direction is appropriately referred to as a left side or a left direction. In the anteroposterior direction, a position or a direction close to the working implement 10 based on the operator's seat on the operation platform 3 is appropriately referred to as a front side or an anterior direction, and an opposite side or an opposite direction of the front side or the anterior direction is appropriately referred to as a rear side or a posterior direction. In the superior-inferior direction, a position or a direction close to the ground-contacting surfaces of the front tires 6F is appropriately referred to as a lower side or an inferior direction, and an opposite side or an opposite direction of the lower side or the inferior direction is appropriately referred to as an upper side or a superior direction.

The vehicle body front portion 2F is arranged anterior to the vehicle body rear portion 2R. The front wheels 5F and the front tires 6F are arranged anterior to the rear wheels 5R and the rear tires 6R. The front wheels 5F and the front tires 6F are arranged on both sides of the vehicle body 2 in the vehicle width direction. The rear wheels 5R and the rear tires 6R are arranged on both sides of the vehicle body 2 in the vehicle width direction. The vehicle body front portion 2F bends leftward and rightward with respect to the vehicle body rear portion 2R.

The working implement 10 is movably coupled to the vehicle body 2. At least a part of the working implement 10 is arranged anterior to the front tires 6F. In the present embodiment, the working implement 10 includes a boom 11 movably coupled to the vehicle body 2, a bucket 12 movably coupled to the boom 11, a bell crank 15, and a link 16.

The boom 11 is actuated by power generated by a boom cylinder 13. The boom cylinder 13 is a hydraulic cylinder which generates power to move the boom 11. One end of the boom cylinder 13 is coupled to the vehicle body 2. Another end of the boom cylinder 13 is coupled to the boom 11. Two boom cylinders 13 are provided. One boom cylinder 13 is provided on a right of the center of the vehicle body 2 in the vehicle width direction. Another boom cylinder 13 is provided on a left of the center of the vehicle body 2 in the vehicle width direction. When the operator operates an operation lever, the boom cylinder 13 extends and retracts. By the boom cylinder 13 thus extending and retracting, a raising operation and a lowering operation of the boom 11 are performed.

The raising operation of the boom 11 is an operation for raising a distal end of the boom 11 to get farther away from the ground surface RS. The lowering operation of the boom 11 is an operation for lowering the distal end of the boom 11 to get closer to the ground surface RS. The raising operation and the lowering operation of the boom 11 are performed within a range of movement of the boom 11. Regarding the boom 11 in the raising operation, movement in a superior direction is restricted beyond an upper end of the range of movement of the boom 11. Regarding the boom 11 in the lowering operation, movement in an inferior direction is restricted beyond a lower end of the range of movement of the boom 11.

The bucket 12 is a working member which has a distal end 12B including a blade edge. The bucket 12 is arranged anterior to the front tires 6F. The bucket 12 is coupled to the distal end of the boom 11. The bucket 12 is actuated by power generated by a bucket cylinder 14. The bucket cylinder 14 is a hydraulic cylinder which generates power to move the bucket 12. A central portion of the bell crank 15 is rotatably coupled to the boom 11. One end of the bucket cylinder 14 is coupled to the vehicle body 2. Another end of the bucket cylinder 14 is coupled to one end of the bell crank 15. Another end of the bell crank 15 is coupled to the bucket 12 via the link 16. One bucket cylinder 14 is provided. The bucket cylinder 14 is provided at a central portion in the vehicle width direction. When the operator operates an operation lever, the bucket cylinder 14 extends and retracts. By the bucket cylinder 14 thus extending and retracting, a dump operation and a tilt operation of the bucket 12 are performed.

The dump operation of the bucket 12 is an operation for rotating the bucket 12 such that an opening of the bucket 12 faces downward and the distal end 12B of the bucket 12 gets closer to the ground surface RS. The tilt operation of the bucket 12 is an operation for rotating the bucket 12 such that the opening of the bucket 12 faces upward and the distal end 12B of the bucket 12 gets farther away from the ground surface RS. The bucket 12 performs the dump operation and the tilt operation within a range of movement of the bucket 12. Regarding the bucket 12 in the dump operation, movement in an inferior direction is restricted beyond a lower end of the range of movement of the bucket 12. Regarding the bucket 12 in the tilt operation, movement in a superior direction is restricted beyond an upper end of the range of movement of the bucket 12.

By performing the dump operation of the bucket 12, excavated material scooped by the bucket 12 is discharged from the bucket 12. By performing the tilt operation of the bucket 12, the bucket 12 scoops excavated material.

As illustrated in FIGS. 2 and 3, ends 12E on both sides of the bucket 12 in the vehicle width direction are arranged outside the tires 6 in the vehicle width direction. In other words, distance between the end 12E on a right side of the bucket 12 and the end 12E on a left side thereof in the vehicle width direction is greater than distance between an outer side surface of the tire 6 on a right side and an outer side surface of the tire 6 on a left side in the vehicle width direction.

Figure 4:
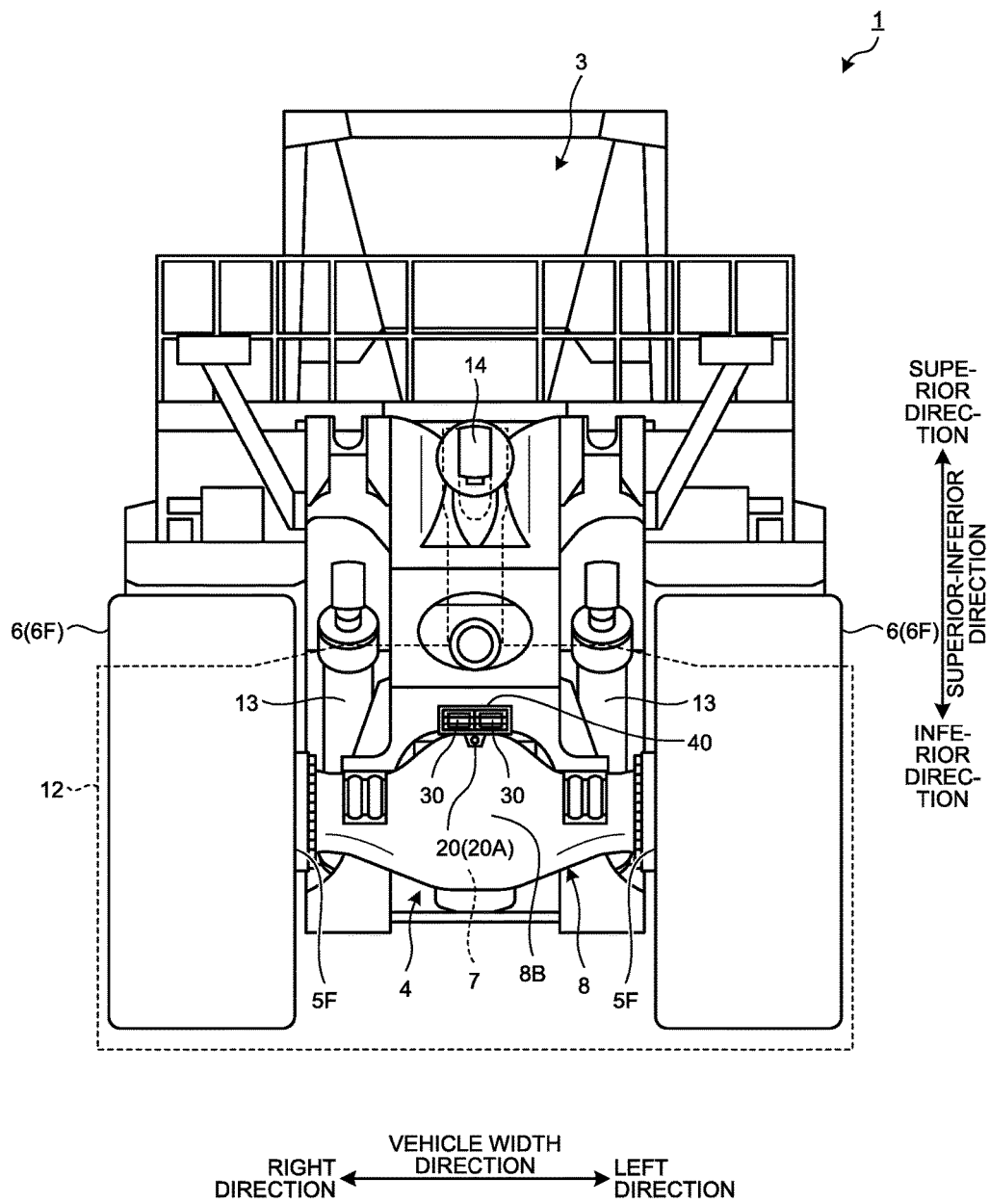
FIG. 4 is a front elevational view illustrating a part of the work vehicle according to the first embodiment.

FIG. 4 is a front elevational view illustrating a part of the wheel loader 1 according to the present embodiment, and corresponds to a view in which the bucket 12 and the bell crank 15 are omitted (illustrated by a dashed line). In the present embodiment, the traveling device 4 includes a power transmission mechanism 7 and a housing 8. The power transmission mechanism 7 transmits power generated in the engine to the front wheels 5F. The housing 8 accommodates at least a part of the power transmission mechanism 7. The engine is arranged in the vehicle body rear portion 2R. The power generated in the engine is transmitted to the left and right front wheels 5F via a differential gear of the power transmission mechanism 7. The differential gear is accommodated in an axle ball 8B, which is a spherical portion of the housing 8. The axle ball 8B is arranged at a central portion in the vehicle width direction. The axle ball 8B is arranged inferior to the bucket cylinder 14.

[Outline of Surroundings Monitoring System]

In the present embodiment, the wheel loader 1 includes a surroundings monitoring system 100 which monitors surroundings of the wheel loader 1 and lets the operator of the wheel loader 1 recognize surrounding conditions of the wheel loader 1. The surroundings monitoring system 100 includes a plurality of cameras 20, a plurality of non-contact sensors 40, a display device 60, and a control device 80. The cameras 20 shoot images of the surroundings of the wheel loader 1. The non-contact sensors 40 detect an obstacle in the surroundings of the wheel loader 1 in a non-contact manner.

[Cameras]

The cameras 20 are mounted on the wheel loader 1 and shoot shot images of the surroundings of the wheel loader 1. In the present embodiment, six cameras 20 are mounted on the wheel loader 1. By the plurality of cameras 20 mounted on the wheel loader 1, the surroundings monitoring system 100 can acquire shot images of different areas in the surroundings of the wheel loader 1.

As illustrated in FIGS. 1, 2, 3, and 4, the cameras 20 are provided on outer surfaces of the vehicle body 2 of the wheel loader 1 in order to acquire shot images of the surroundings of the wheel loader 1. In the present embodiment, the cameras 20 include cameras 20A, 20B, 20C, 20D, 20E, and 20F. The camera 20A shoots an image of an anterior area outside the vehicle body 2. The camera 20B shoots an image of a right area outside the vehicle body 2. The camera 20C shoots an image of a right area and a right-posterior area outside the vehicle body 2. The camera 20D shoots an image of a posterior area outside the vehicle body 2. The camera 20E shoots an image of a left area and a left-posterior area outside the vehicle body 2. The camera 20F shoots an image of a left area outside the vehicle body 2.

In the present embodiment, the camera 20A is provided in the vehicle body front portion 2F. The cameras 20B, 20C, 20D, 20E, and 20F are provided in the vehicle body rear portion 2R.

Figure 5:
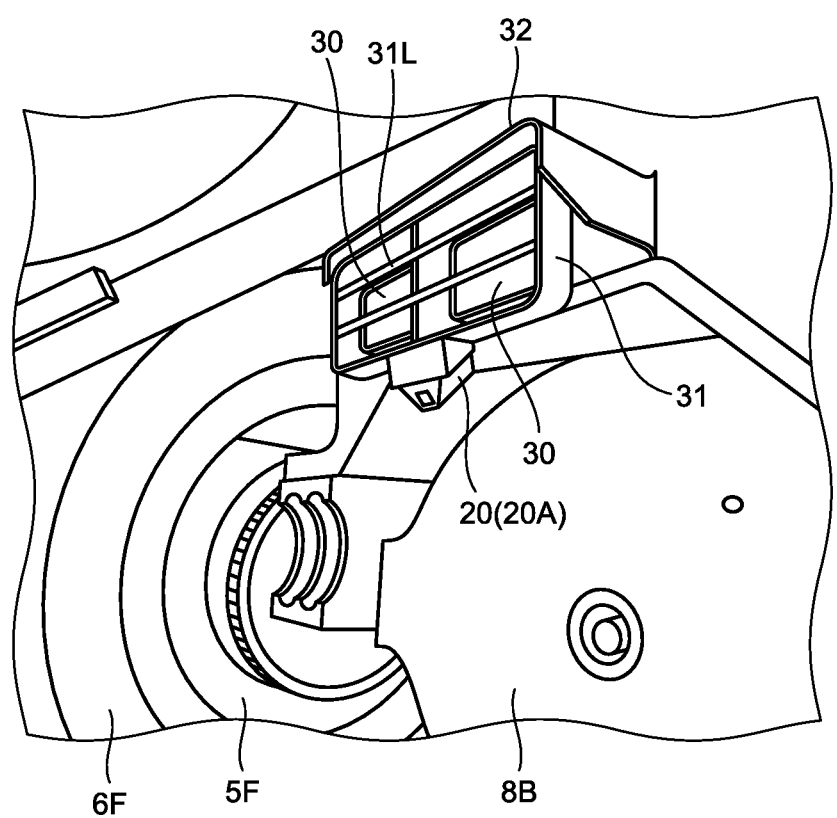
FIG. 5 is a perspective view illustrating an example of a camera according to the first embodiment.

FIG. 5 is a perspective view illustrating an example of the camera 20A according to the present embodiment. As illustrated in FIGS. 4 and 5, the camera 20A is arranged at a front portion of the vehicle body front portion 2F. The camera 20A is arranged inferior to the bucket cylinder 14, and is arranged superior to the axle ball 8B of the housing 8. One camera 20A is arranged at a central portion in the vehicle width direction. The camera 20A is arranged slightly anterior to the axle ball 8B.

The wheel loader 1 includes illumination devices 30 which are supported by the vehicle body 2 and illuminate the shooting area of the camera 20A. Each of the illumination devices 30 includes a front lamp which emits illumination light. In the present embodiment, two illumination devices 30 are provided superior to the camera 20A. The illumination devices 30 are accommodated in a casing 31. The casing 31 includes rod members 31L which protect the illumination devices 30 without preventing irradiation of the illumination light. The rod members 31L are arranged anterior to the illumination devices 30.

A cover member 32 is provided in the vehicle body front portion 2F of the wheel loader 1. The cover member 32 is arranged between the bucket cylinder 14 and the camera 20A in the superior-inferior direction, and protects the camera 20A. In the present embodiment, the cover member 32 is an eave member arranged superior to the camera 20A and the illumination devices 30.

Figure 6:
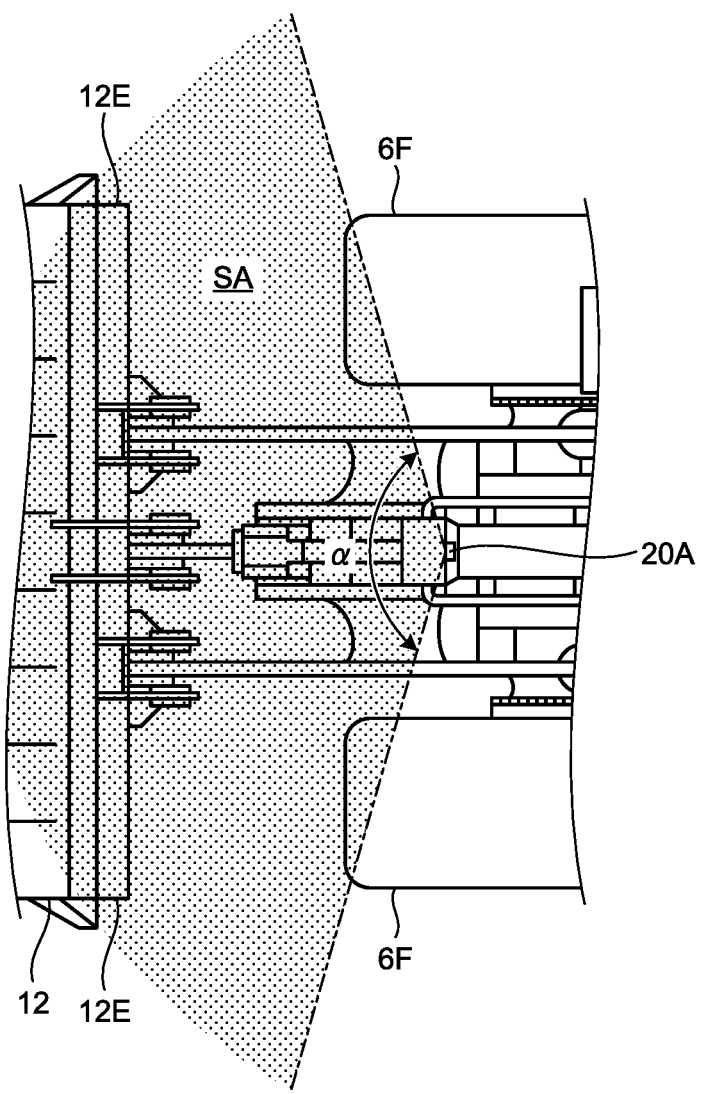
FIG. 6 is a schematic view for explaining a shooting area of the camera according to the first embodiment.
Figure 7:
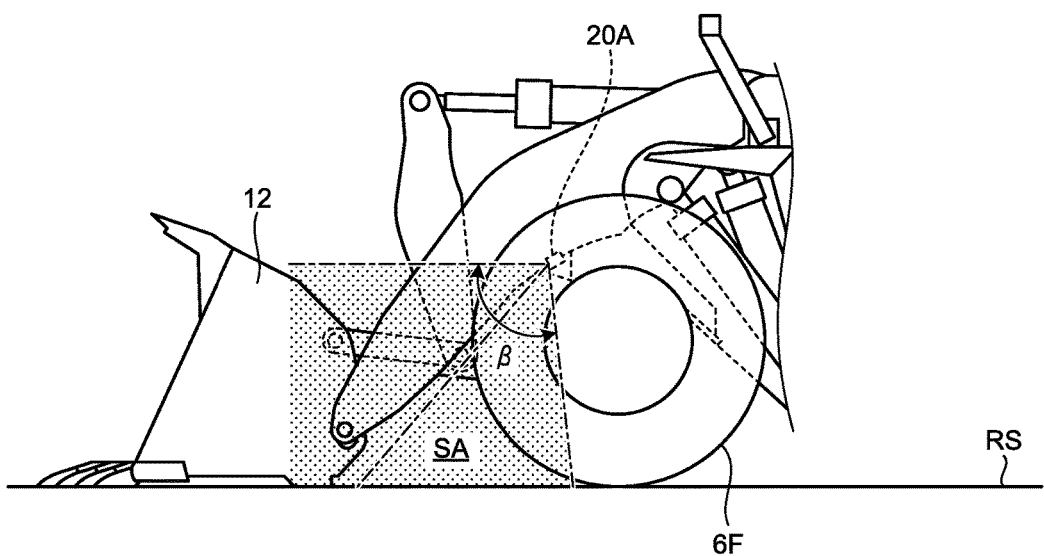
FIG. 7 is a schematic view for explaining the shooting area of the camera according to the first embodiment.
Figure 8:
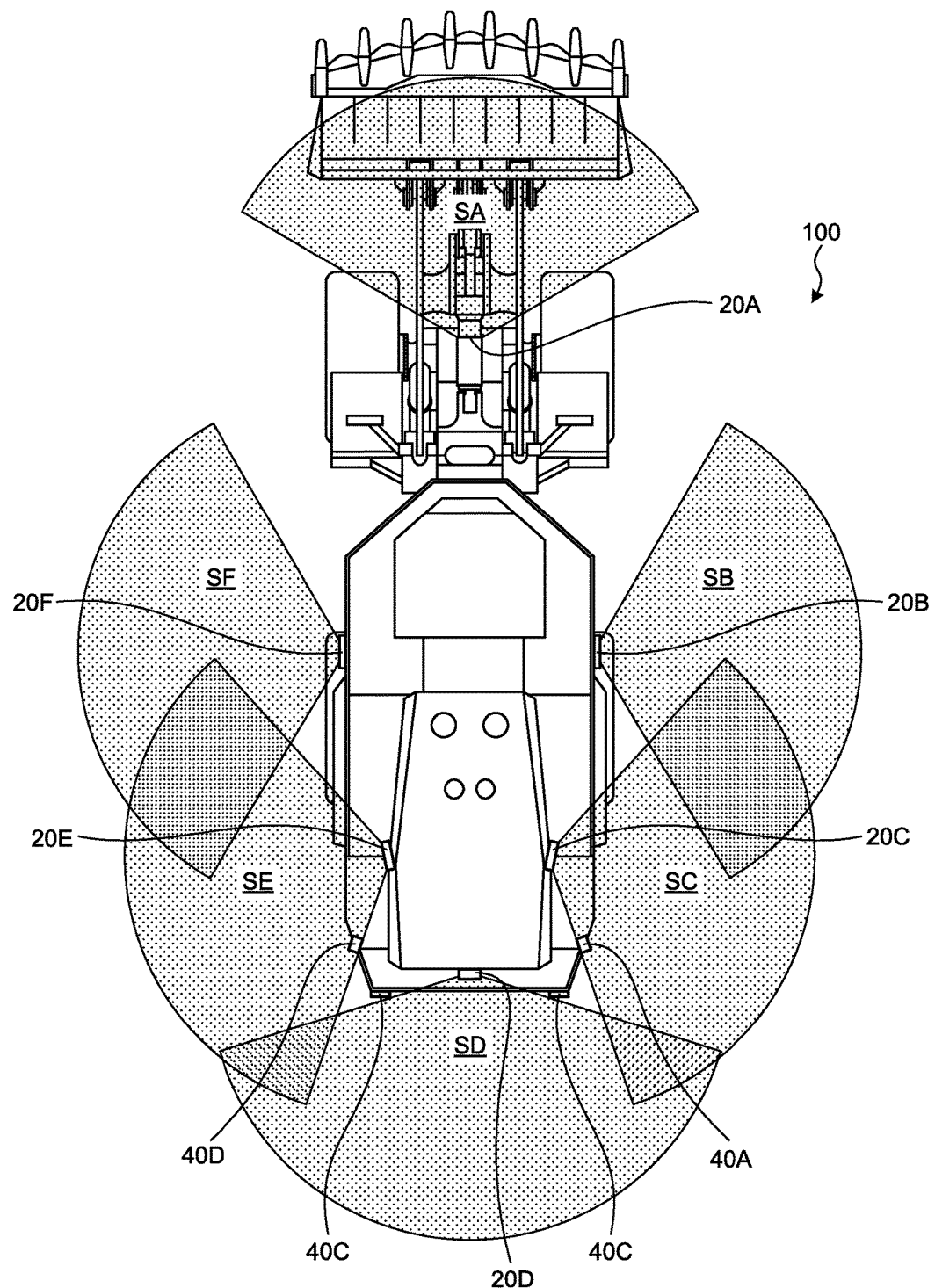
FIG. 8 is a schematic view for explaining shooting areas of cameras according to the first embodiment.

FIGS. 6 and 7 are schematic views for explaining a shooting area SA of the camera 20A according to the present embodiment. FIG. 6 illustrates the shooting area SA from a superior view. FIG. 7 illustrates the shooting area SA from a lateral view. FIG. 8 is a schematic view for explaining respective shooting areas SA, SB, SC, SD, SE, and SF of the cameras 20A, 20B, 20C, 20D, 20E, and 20F according to the present embodiment, from a superior view. The shooting areas of the cameras 20 include areas of fields of view of optical systems of the cameras 20. Each of the cameras 20 shoots an image of an obstacle present in the corresponding shooting area, for example.

The camera 20A shoots an image of the shooting area SA defined to be an anterior area outside the vehicle body 2. The shooting area SA of the camera 20A is defined to spread in an anterior direction of the vehicle body 2. As illustrated in FIG. 6, an angle of view α of the camera 20A in the vehicle width direction is about 120[°]. As illustrated in FIG. 7, an angle of view β of the camera 20A in the superior-inferior direction is from 90[°] to 100[°].

As illustrated in FIGS. 6 and 7, the shooting area SA of the camera 20A includes at least a part of the front tires 6F. In the present embodiment, the shooting area SA of the camera 20A includes front portions of the front tires 6F. In addition, the shooting area SA of the camera 20A includes the ground surface RS between the front tires 6F and the bucket 12 which is arranged anterior to the front tires 6F and is being in contact with the ground surface RS. Furthermore, the shooting area SA of the camera 20A includes the ends 12E on both sides of the bucket 12.

In other words, in the present embodiment, the camera 20A shoots an image of the ground surface RS between the bucket 12 and the front tires 6F such that the ends 12E on both sides of the bucket 12 and the front portions of the front tires 6F are included in a shot image in a state where a lowering operation of the boom 11 has been performed so as to bring the bucket 12 into contact with the ground surface RS.

The camera 20B shoots an image of the shooting area SB defined to be a right area outside the vehicle body 2. The shooting area SB of the camera 20B is defined to spread in a right direction of the vehicle body 2. As illustrated in FIGS. 2, 8, and the like, the camera 20B is provided at a right-side portion of the vehicle body rear portion 2F. In the present embodiment, the camera 20B is provided in the vicinity of a platform which is a middle portion of steps leading to the operator's cabin on the operation platform 3.

The camera 20C shoots an image of the shooting area SC defined to be a right area and a right-posterior area outside the vehicle body 2. The shooting area SC of the camera 20C is defined to spread in a right direction and a right-posterior direction of the vehicle body 2. As illustrated in FIGS. 2, 8, and the like, the camera 20C is provided at a right portion of a radiator guard provided at a rear portion of the vehicle body rear portion 2F.

The camera 20D shoots an image of the shooting area SD defined to be a posterior area outside the vehicle body 2. The shooting area SD of the camera 20D is defined to spread in a posterior direction of the vehicle body 2. As illustrated in FIGS. 2, 8, and the like, the camera 20D is provided at a central portion of the radiator guard provided at the rear portion of the vehicle body rear portion 2F.

The camera 20E shoots an image of a left area and a left-posterior area outside the vehicle body 2. The shooting area SE of the camera 20E is defined to spread in a left direction and a left-posterior direction of the vehicle body 2. As illustrated in FIGS. 1, 2, 8, and the like, the camera 20E is provided at a left portion of the radiator guard provided at the rear portion of the vehicle body rear portion 2F.

The camera 20F shoots an image of the shooting area SF defined to be a left area outside the vehicle body 2. The shooting area SF of the camera 20F is defined to spread in a left direction of the vehicle body 2. As illustrated in FIGS. 1, 2, 8, and the like, the camera 20F is provided at a left-side portion of the vehicle body rear portion 2F. In the present embodiment, the camera 20F is provided in the vicinity of a platform which is a middle portion of steps leading to the operator's cabin on the operation platform 3.

The surroundings monitoring system 100 can acquire shot images of the surroundings of the wheel loader 1 using the plurality of the cameras 20.

[Non-Contact Sensors]

The non-contact sensors 40 are mounted on the wheel loader 1 and detect an obstacle in the surroundings of the wheel loader 1 in a non-contact manner. As the obstacle, for example, a passenger car is exemplified. The non-contact sensors 40 are arranged inferior to the cameras 20. In the present embodiment, each of the non-contact sensors 40 includes a radar device capable of emitting a radio wave to an obstacle and detecting the obstacle in a non-contact manner. Each of the non-contact sensors 40 may include a laser scanner device capable of emitting laser light to an obstacle and detecting the obstacle in a non-contact manner. In the present embodiment, four non-contact sensors 40 are mounted on the wheel loader 1. By the plurality of non-contact sensors 40 mounted on the wheel loader 1, the surroundings monitoring system 100 can detect obstacles present in different areas in the surroundings of the wheel loader 1.

As illustrated in FIGS. 1, 2, 8, and the like, the non-contact sensors 40 are provided on outer surfaces of the vehicle body 2 of the wheel loader 1 in order to detect an obstacle in the surroundings of the wheel loader 1. In the present embodiment, the non-contact sensors 40 include non-contact sensors 40A, 40B, 40C, and 40D. The non-contact sensor 40A detects obstacles in a right area and a right-posterior area outside the vehicle body 2. The non-contact sensor 40B detects obstacles in a posterior area and a right-posterior area outside the vehicle body 2. The non-contact sensor 40C detects obstacles in a posterior area and a left-posterior area outside the vehicle body 2. The non-contact sensor 40D detects obstacles in a left area and a left-posterior area outside the vehicle body 2. In other words, respective non-contact sensors 40 are installed such that a direction of radio wave emitted from the non-contact sensor 40B and a direction of radio wave emitted from the non-contact sensor 40C intersect, and thereby every obstacle present in the posterior area outside the vehicle body 2 is detected without fail.

In the present embodiment, the non-contact sensors 40A, 40B, 40C, and 40D are provided in the vehicle body rear portion 2R.

Figure 9:
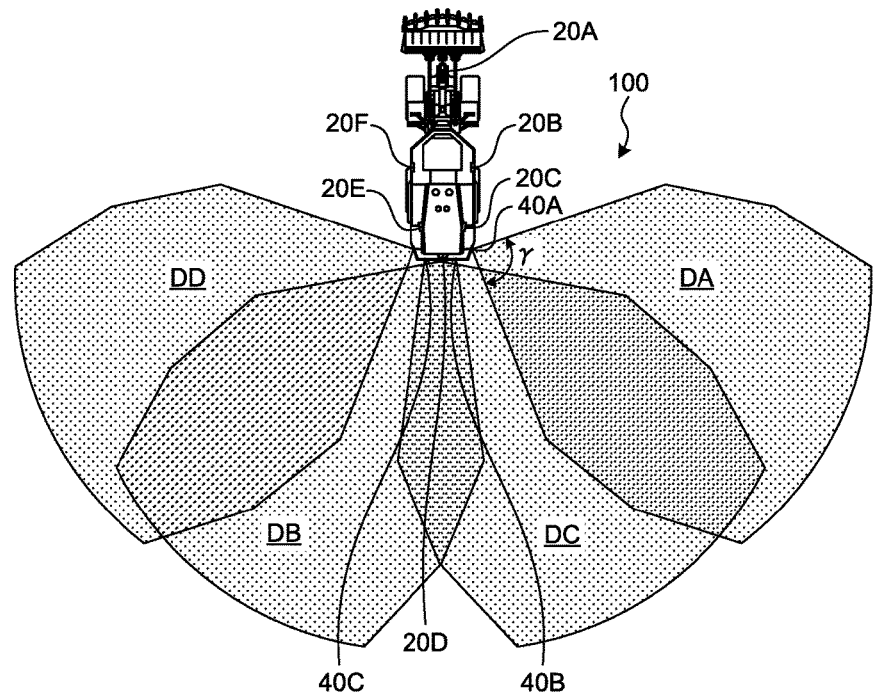
FIG. 9 is a schematic view for explaining detection areas of non-contact sensors according to the first embodiment.
Figure 10:
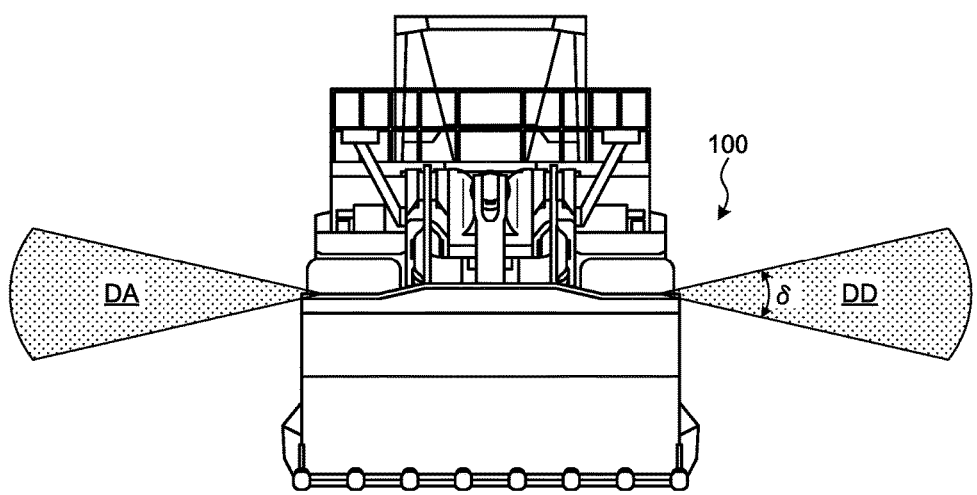
FIG. 10 is a schematic view for explaining the detection areas of the non-contact sensors according to the first embodiment.

FIGS. 9 and 10 are schematic views for explaining respective detection areas DA, DB, DC, and DD of the non-contact sensors 40A, 40B, 40C, and 40D according to the present embodiment. FIG. 9 illustrates the detection areas of the non-contact sensors 40 from a superior view. FIG. 10 illustrates the detection areas of the non-contact sensors 40 from an anterior or posterior view. The detection areas of the non-contact sensors 40 include an area where emitted radio waves can reach. Each of the non-contact sensors 40 detects an obstacle present in the corresponding detection area.

As illustrated in FIG. 9, a detection angle γ of each of the non-contact sensors 40 in a horizontal direction is about 80[°]. As illustrated in FIG. 10, a detection angle δ of each of the non-contact sensors 40 in a vertical direction is about 30[°].

The non-contact sensor 40A detects an obstacle in the detection area DA defined to be a right area outside the vehicle body 2. The detection area DA of the non-contact sensor 40A is defined to spread in a right direction of the vehicle body 2. As illustrated in FIGS. 2, 8, and the like, the non-contact sensor 40A is provided at a right-side portion of the vehicle body rear portion 2F. In the present embodiment, the non-contact sensor 40A is provided, for example, in the vicinity of a lower portion of the steps leading to the operator's cabin on the operation platform 3.

The non-contact sensor 40B detects an obstacle in the detection area DB defined to be a posterior area and a left-posterior area outside the vehicle body 2. The detection area DB of the non-contact sensor 40B is defined to spread in a posterior direction and a left-posterior direction of the vehicle body 2. As illustrated in FIGS. 2, 8, and the like, the non-contact sensor 40B is provided, for example, at a right portion of a rear bumper provided at a rear portion of the vehicle body rear portion 2F.

The non-contact sensor 40C detects an obstacle in the detection area DC defined to be a posterior area and a right-posterior area outside the vehicle body 2. The detection area DC of the non-contact sensor 40C is defined to spread in a posterior direction and a right-posterior direction of the vehicle body 2. As illustrated in FIGS. 1, 2, 8, and the like, the non-contact sensor 40C is provided at a left portion of the rear bumper provided at the rear portion of the vehicle body rear portion 2F.

The non-contact sensor 40D detects an obstacle in the detection area DD defined to be a left area outside the vehicle body 2. The detection area DD of the non-contact sensor 40D is defined to spread in a left direction of the vehicle body 2. As illustrated in FIGS. 1, 2, 8, and the like, the non-contact sensor 40D is provided at a left-side portion of the vehicle body rear portion 2F. In the present embodiment, the non-contact sensor 40D is provided in the vicinity of a lower portion of the steps leading to the operator's cabin on the operation platform 3.

The shooting areas of the cameras 20 and the detection areas of the non-contact sensors 40 at least partially overlap.

[Control Device]

Figure 11:
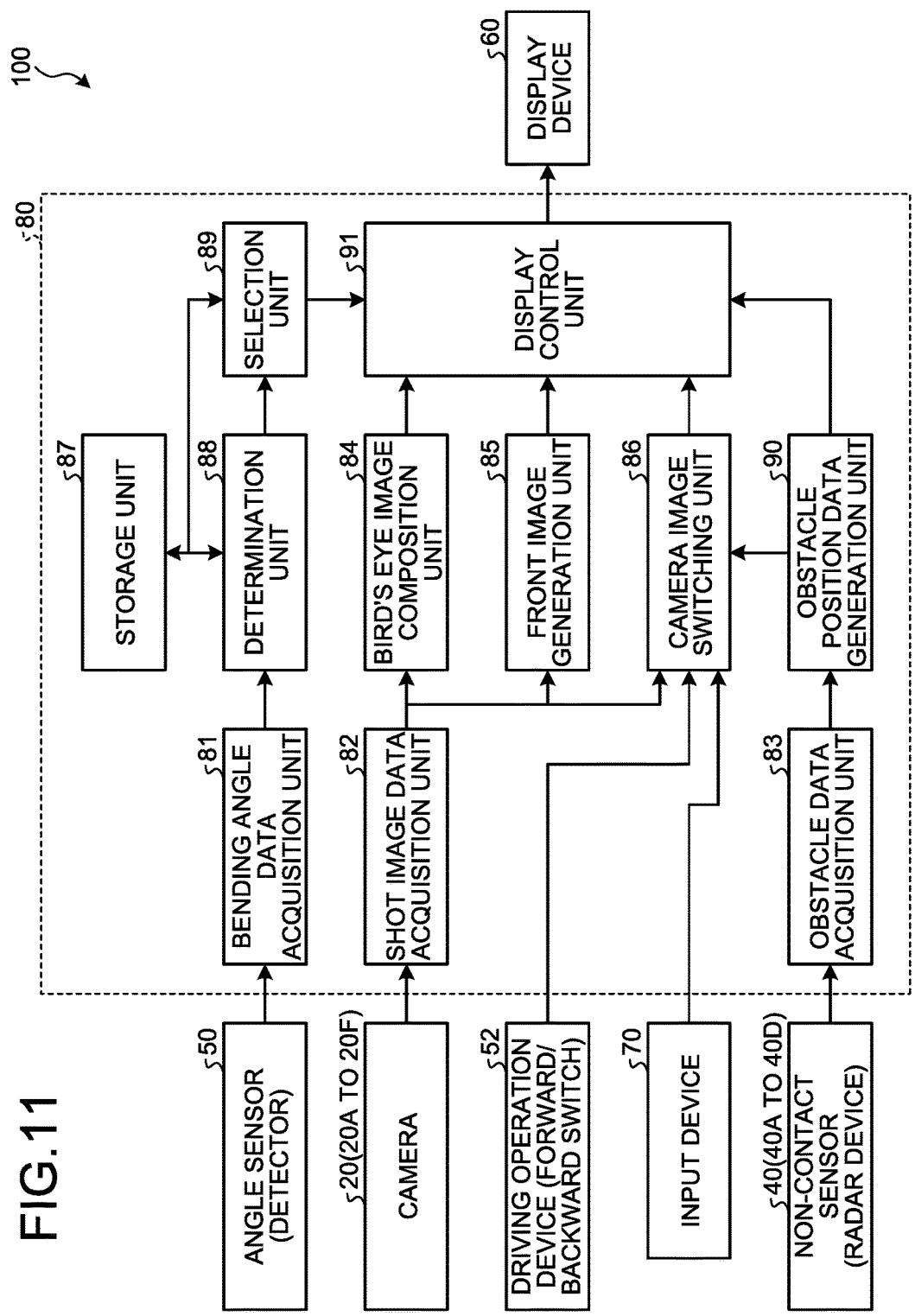
FIG. 11 is a functional block diagram illustrating an example of a control device according to the first embodiment.

Next, the control device 80 according to the present embodiment will be described. FIG. 11 is a functional block diagram illustrating an example of the surroundings monitoring system 100 including the control device 80 according to the present embodiment. The control device 80 is connected to each of the angle sensor 50, the plurality of cameras 20, a driving operation device 52 including a forward/backward switch, an input device 70, the plurality of non-contact sensors 40, and the display device 60. The control device 80, the angle sensor 50, the plurality of cameras 20, the driving operation device 52, the input device 70, the plurality of non-contact sensors 40, and the display device 60 are mounted on the wheel loader 1.

The control device 80 includes a computer system. The control device 80 has a processor such as a central processing unit (CPU), and a storage device including a non-volatile memory such as a read only memory (ROM) or storage and a volatile memory such as a random access memory (RAM).

The display device 60 and the input device 70 are arranged in the operator's cabin on the operation platform 3. The display device 60 includes a flat panel display such as a liquid crystal display (LCD) or an organic electroluminescence display (OELD). The input device 70 includes at least one of a switch button, a computer keyboard, a mouse, and a touch sensor provided on a display screen of the display device 60. The control device 80 outputs display data to the display device 60. The operator of the wheel loader 1 can visually observe the display data displayed on the display device 60. The display device 60 displays the display data output from the control device 80 on the display screen. The input device 70 is operated by the operator of the wheel loader 1. The input device 70, by being operated by the operator, generates input data and outputs the data to the control device 80.

The control device 80 includes a bending angle data acquisition unit 81, a shot image data acquisition unit 82, an obstacle data acquisition unit 83, a bird's eye image composition unit 84, a front image generation unit 85, a camera image switching unit 86, a storage unit 87, a determination unit 88, a selection unit 89, an obstacle position data generation unit 90, and a display control unit 91.

The bending angle data acquisition unit 81 acquires, from the angle sensor 50, bending angle data which indicates a bending angle θ between the vehicle body front portion 2F and the vehicle body rear portion 2R detected by the angle sensor 50 mounted on the wheel loader 1.

The shot image data acquisition unit 82 acquires, from the cameras 20, respectively, shot image data indicating shot images respectively shot by the cameras 20 mounted on the wheel loader 1.

The obstacle data acquisition unit 83 acquires, from the non-contact sensors 40, respectively, obstacle data indicating obstacles respectively detected by the non-contact sensors 40 mounted on the wheel loader 1.

The bird's eye image composition unit 84 performs image processing of a plurality of shot image data acquired by the shot image data acquisition unit 82 to generate bird's eye image data indicating a bird's eye image BI of the surroundings of the wheel loader 1. In the present embodiment, the bird's eye image composition unit 84 generates the bird's eye image data of the surroundings of the wheel loader 1 based on the plurality of shot image data acquired by the cameras 20B, 20C, 20D, 20E, and 20F provided in the vehicle body rear portion 2F.

The front image generation unit 85 generates front image data indicating an image of an anterior area outside the wheel loader 1 based on the shot image data acquired by the shot image data acquisition unit 82. The front image generation unit 85 generates front image data based on the shot image data acquired by the camera 20A provided in the vehicle body front portion 2F.

The camera image switching unit 86 selects specific shot image datum from the shot image data respectively shot by the cameras 20. In the present embodiment, the camera image switching unit 86 selects the specific shot image datum from the shot image data based on an operation signal of the forward/backward switch of the driving operation device 52. The camera image switching unit 86 can select the specific shot image datum from the shot image data based on the input data generated by the input device 70.

The storage unit 87 stores library image data indicating representative images of the wheel loader 1 which respectively belong to multiple bending angle ranges FR between the vehicle body front portion 2F and the vehicle body rear portion 2R. The representative images of the wheel loader 1 include a state image corresponding to a top view of the wheel loader 1 from a superior view.

Figure 12:
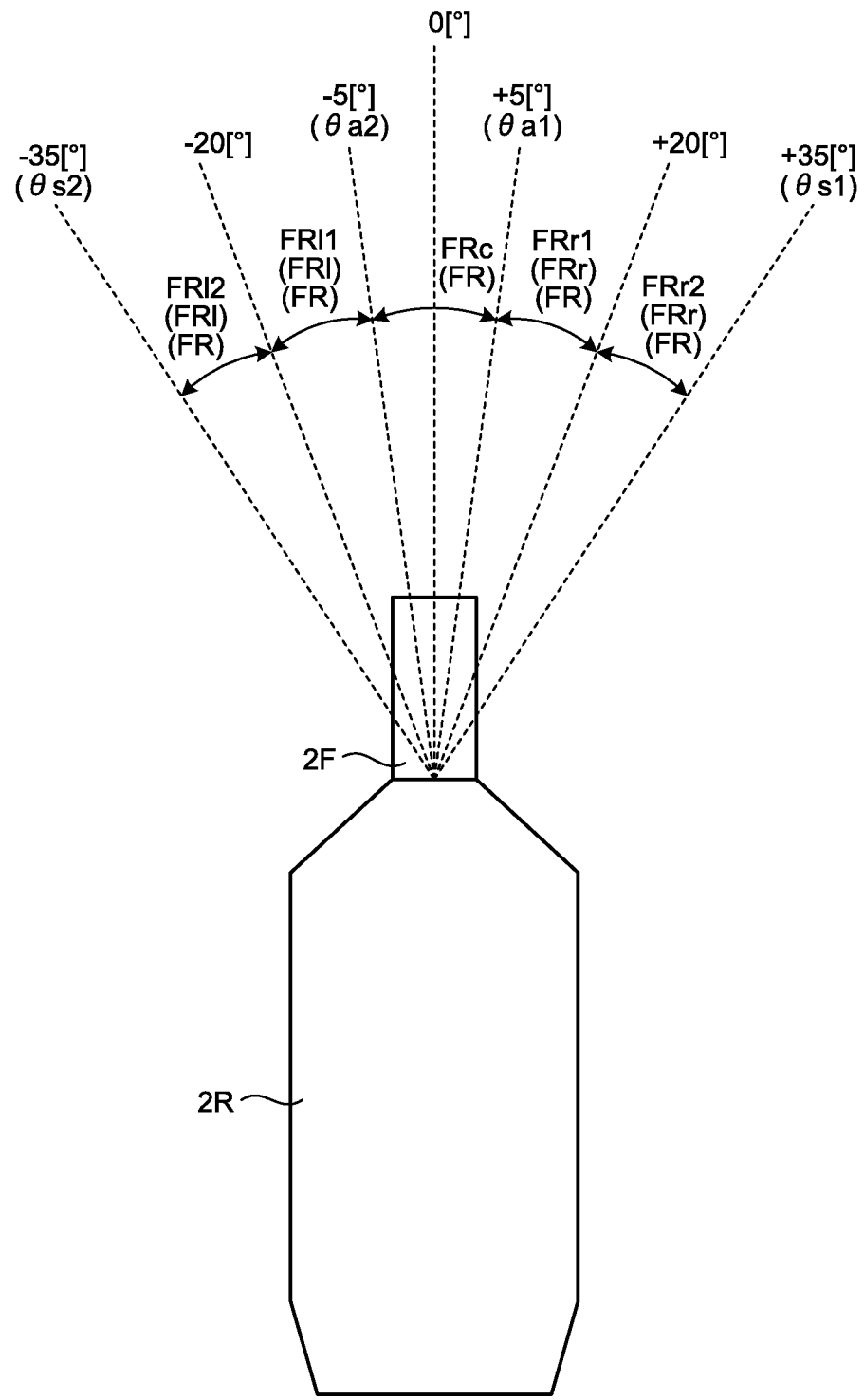
FIG. 12 is a schematic view for explaining bending angle ranges according to the first embodiment.

FIG. 12 is a schematic view for explaining the bending angle ranges FR according to the present embodiment. The vehicle body front portion 2F bends leftward and rightward with respect to the vehicle body rear portion 2R. The multiple bending angle ranges FR are defined between a first threshold bending angle θs1 on a right side and a second threshold bending angle θs2 on a left side so as not to overlap with each other. There is no same angle in any bending angle range FR among the multiple bending angle ranges FR and a bending angle range FR defined to be adjacent to the bending angle range FR. A plurality of representative images is prepared and one representative image is defined for each of the multiple bending angle ranges FR.

Reference of bending angle θ is defined to be 0[°]. What is meant by that the bending angle θ is 0[°] is that the wheel loader 1 is traveling in a straight line. In the present embodiment, using a bending angle θ of 0[°] as reference, a bending angle θ between the vehicle body front portion 2F and the vehicle body rear portion 2R obtained when the vehicle body front portion 2F bends rightward is defined to be a positive value, and a bending angle θ between the vehicle body front portion 2F and the vehicle body rear portion 2R obtained when the vehicle body front portion 2F bends leftward is defined to be a negative value. In the present embodiment, the first threshold bending angle θs1 on the right side is +35[°]. The second threshold bending angle θs2 on the left side is −35[°]. The multiple bending angle ranges FR are defined between +35[°] and −35[°] so as not to overlap with each other.

In the present embodiment, the bending angle ranges FR include a reference bending angle range FRc including a bending angle of 0[°], a plurality of right bending angle ranges FRr on a right side of the reference bending angle range FRc, and a plurality of left bending angle ranges FRl on a left side of the reference bending angle range FRc.

In the present embodiment, an absolute value of a bending angle θa1 which defines a right end of the reference bending angle range FRc and an absolute value of a bending angle θa2 which defines a left end thereof are equal. In the present embodiment, the bending angle θa1 is +5[°] and the bending angle θa2 is −5[°]. In other words, in the present embodiment, the reference bending angle range FRc is a range in which the bending angle θ is −5[°] to +5[°] (−5[°]≤θ≤+5[°]).

In the present embodiment, a size of the plurality of right bending angle ranges FRr and a size of the plurality of left bending angle ranges FRl are equal. The right bending angle ranges FRr include a first right bending angle range FRr1 and a second right bending angle range FRr2. The first right bending angle range FRr1 is a range in which the bending angle θ is greater than +5[°] and smaller than or equal to +20[°] (+5[°]≤θ≤+20[°]). The second right bending angle range FRr2 is a range in which the bending angle θ is greater than +20[°] and smaller than or equal to +35[°] (+20[°]≤θ≤+35[°]). The left bending angle ranges FRl include a first left bending angle range FRl1 and a second left bending angle range FRl2. The first left bending angle range FRl1 is a range in which the bending angle θ is greater than or equal to −20[°] and smaller than −5[°] (−20[°]≤θ<−5[°]). The second left bending angle range FRl2 is a range in which the bending angle θ is greater than or equal to −35[°] and smaller than −20[°] (−35[°]≤θ<−20[°]).

The representative images include a state image which indicates a shape of the wheel loader 1, from a superior view, of which the vehicle body front portion 2F bends by a bending angle θ, which is a median of a bending angle range FR. The state image may be an image which indicates only a contour of the wheel loader 1 from a superior view. In that case, a display mode for the contour may be a solid line or a dashed line. In addition, the state image may be an image in which a portion indicating the working implement 10 is omitted. Furthermore, a plurality of state images may be stored in the storage unit 87 correspondingly to sizes and shapes of buckets 12 to be attached, and a state image corresponding to a bucket 12 actually attached may be selectable, for example, by operating the input device 70.

FIGS. 13 to 19 are views each schematically illustrating an example of the representative images of the wheel loader 1 which respectively belong to the multiple bending angle ranges FR according to the present embodiment.

Figure 13:
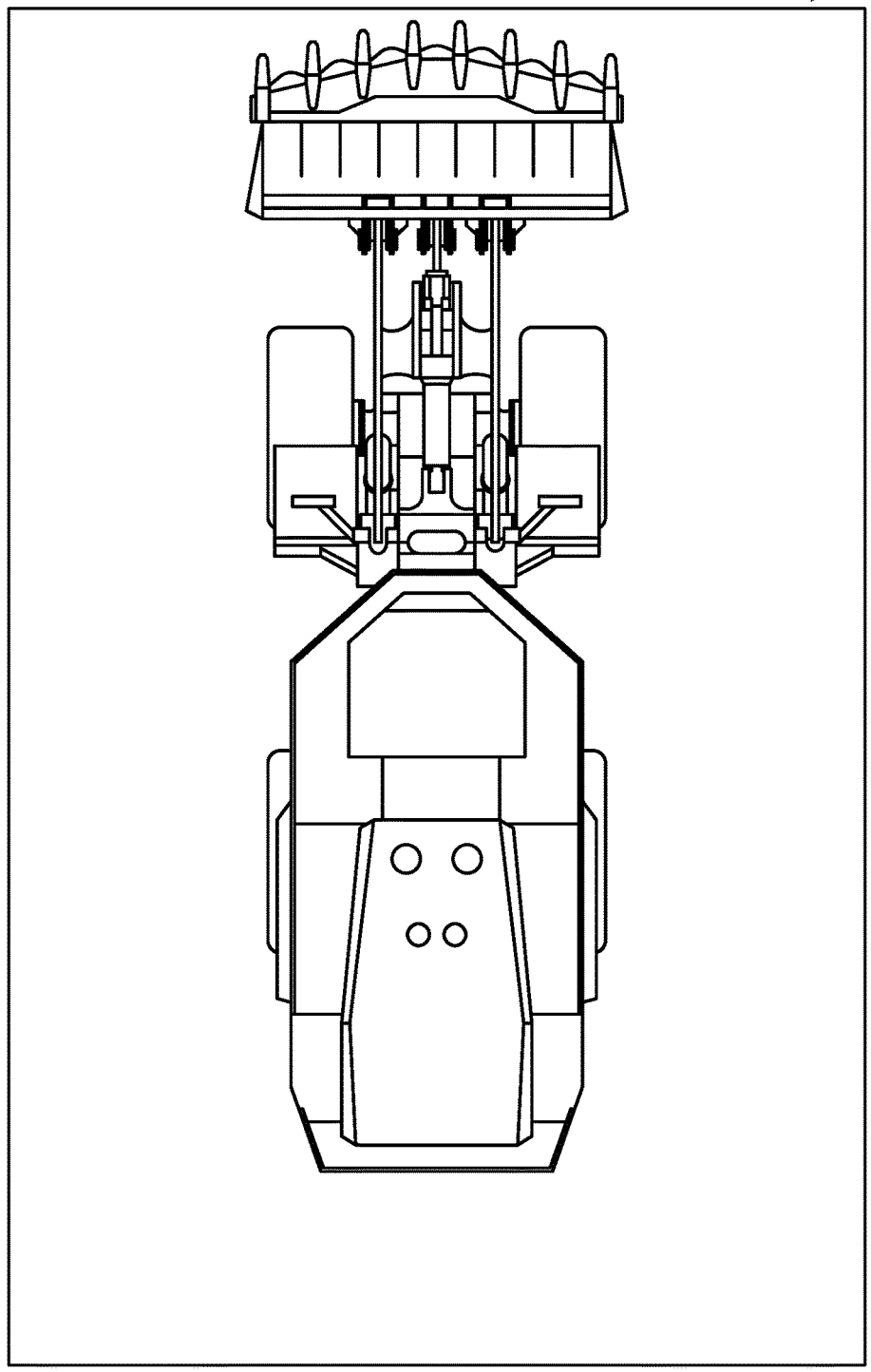
FIG. 13 is a view schematically illustrating an example of representative images of a work vehicle which respectively belong to multiple bending angle ranges according to the first embodiment.

FIG. 13 is a view illustrating a state image of the wheel loader 1 which belongs to the reference bending angle range FRc in which the bending angle θ is −5[°] to +5[°]. A median bending angle θ of the reference bending angle range FRc is 0[°]. As illustrated in FIG. 13, the state image of the wheel loader 1 which belongs to the reference bending angle range FRc indicates a state where the bending angle θ is 0[°].

Figure 14:
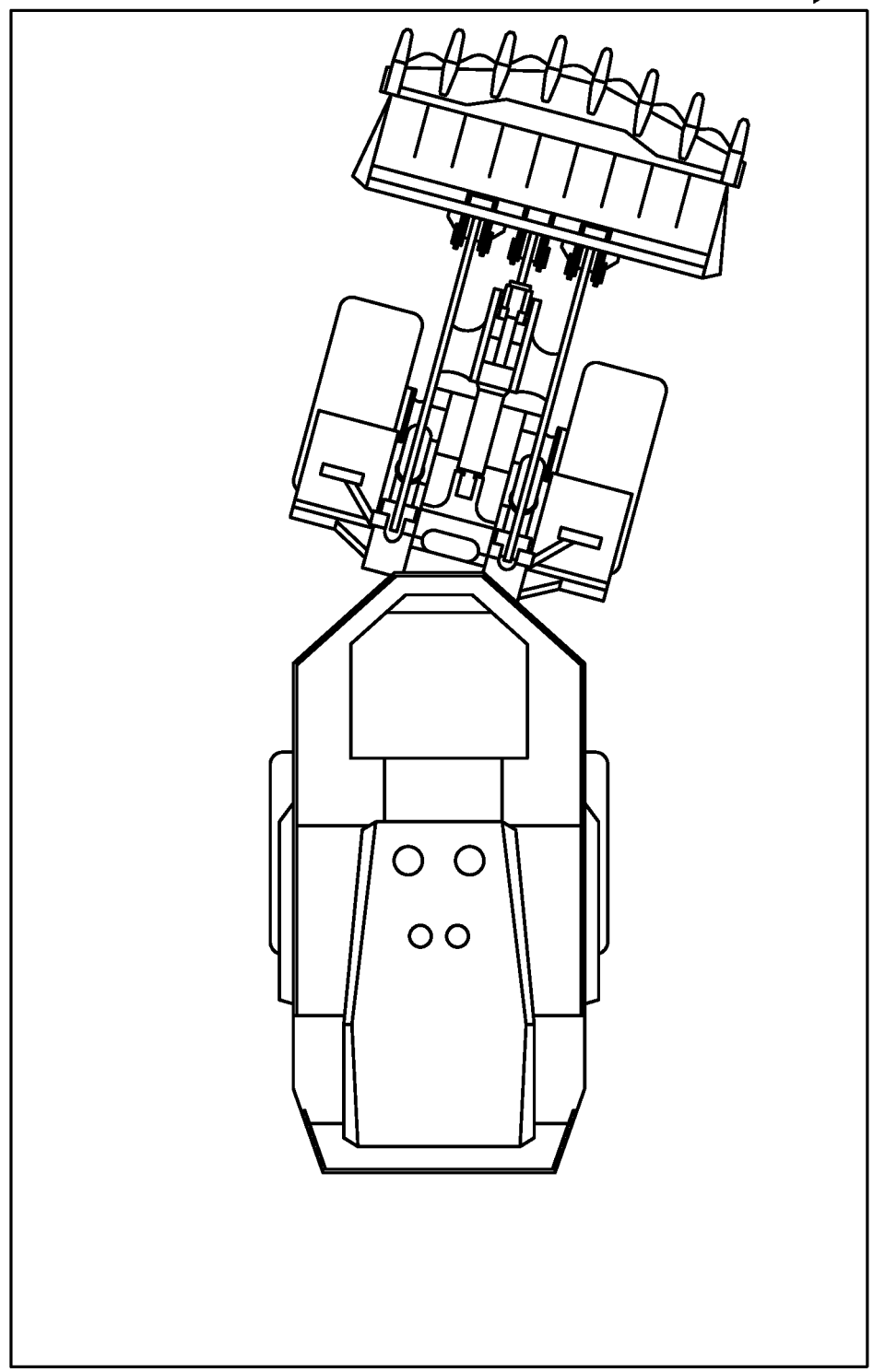
FIG. 14 is a view schematically illustrating an example of the representative images of the work vehicle which respectively belong to the multiple bending angle ranges according to the first embodiment.

FIG. 14 is a view illustrating a state image of the wheel loader 1 which belongs to the first right bending angle range FRr1 in which the bending angle θ is greater than +5[°] and smaller than or equal to +20[°]. A median bending angle θ of the first right bending angle range FRr1 is +12.5[°]. As illustrated in FIG. 14, the state image of the wheel loader 1 which belongs to the first right bending angle range FRr1 indicates a state where the bending angle θ is +12.5[°].

Figure 15:
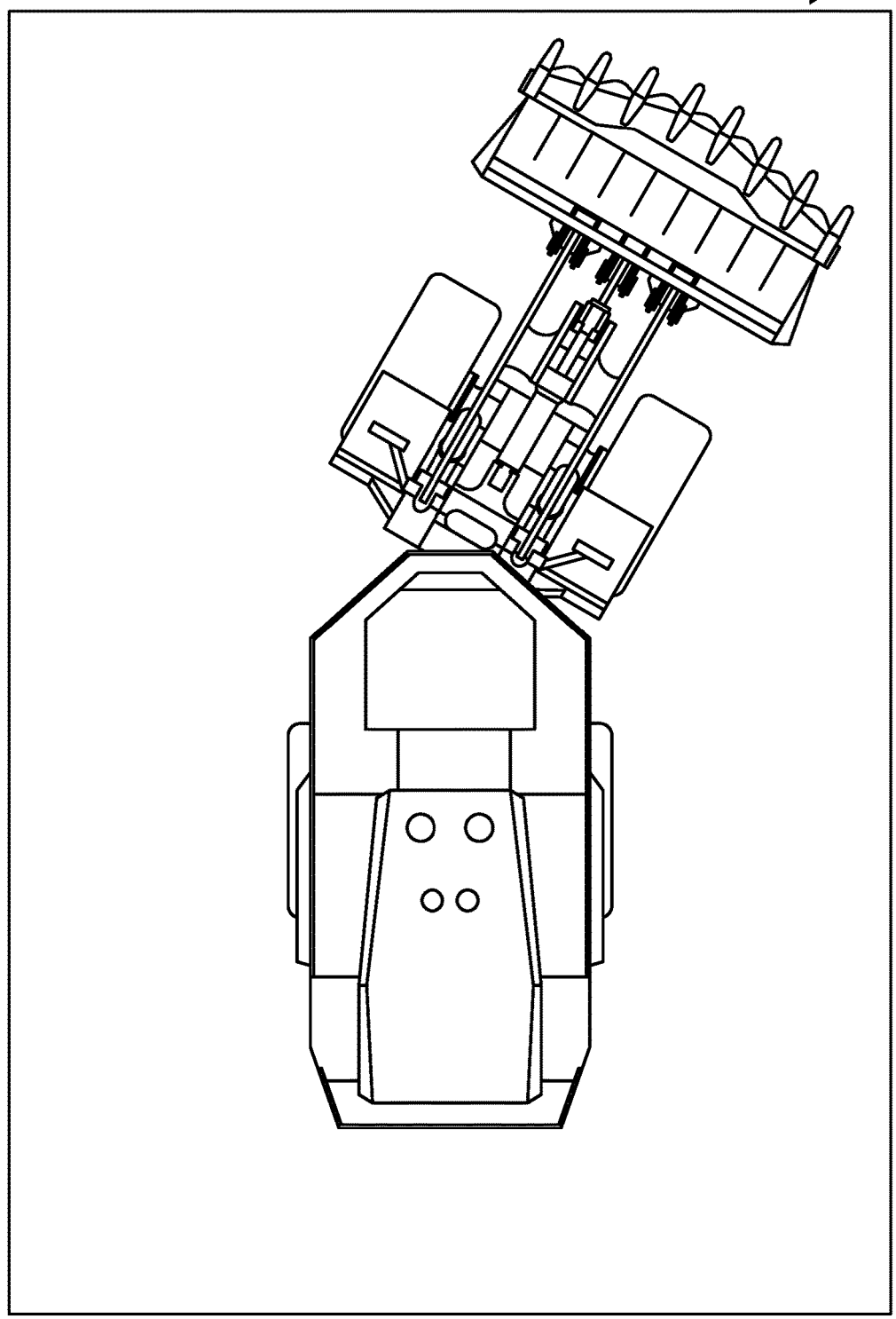
FIG. 15 is a view schematically illustrating an example of the representative images of the work vehicle which respectively belong to the multiple bending angle ranges according to the first embodiment.

FIG. 15 is a view illustrating a state image of the wheel loader 1 which belongs to the second right bending angle range FRr2 in which the bending angle θ is greater than +20[°] and smaller than or equal to +35[°]. A median bending angle θ of the second right bending angle range FRr2 is +27.5[°]. As illustrated in FIG. 15, the state image of the wheel loader 1 which belongs to the second right bending angle range FRr2 indicates a state where the bending angle θ is +27.5[°].

Figure 16:
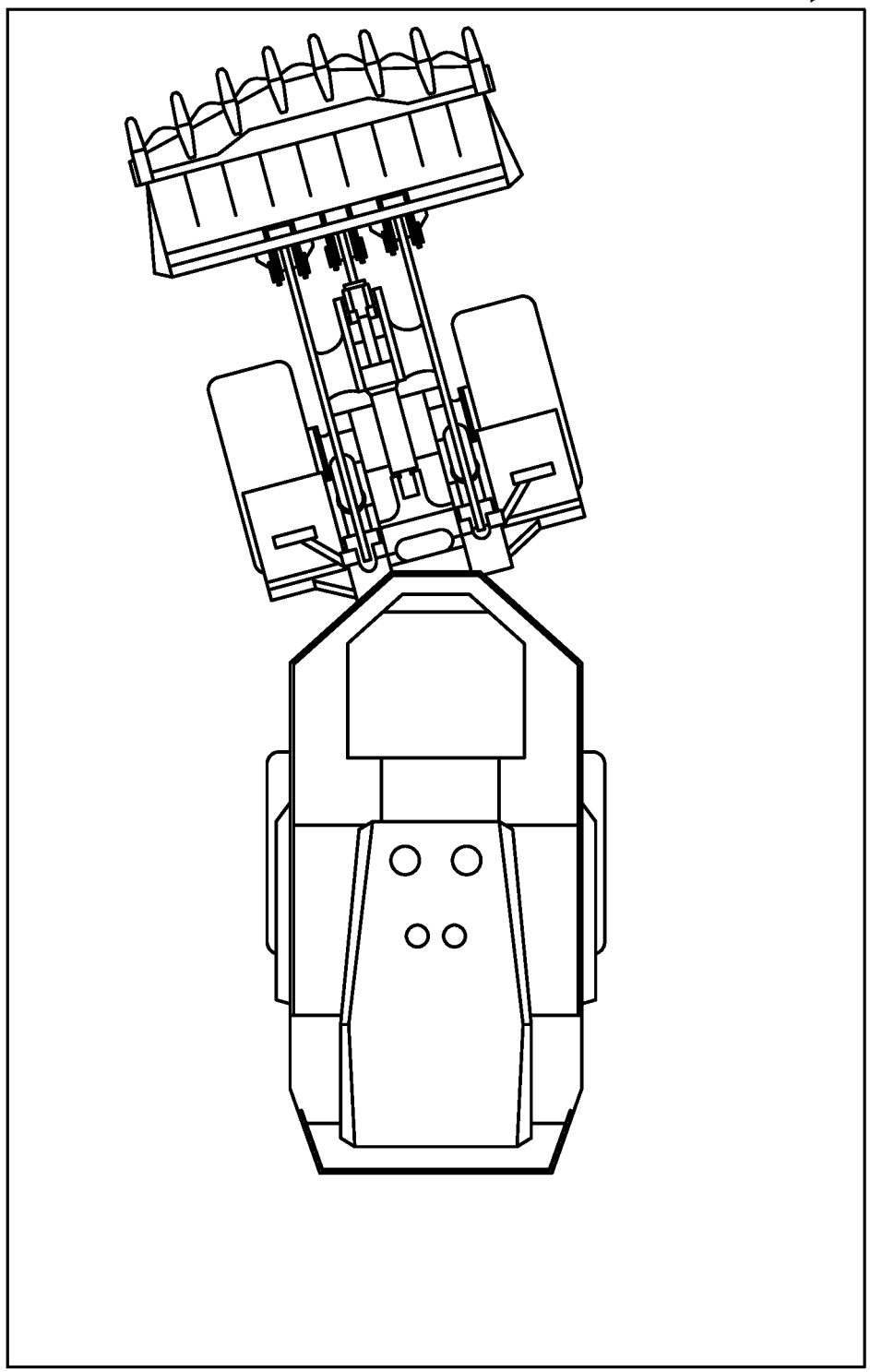
FIG. 16 is a view schematically illustrating an example of the representative images of the work vehicle which respectively belong to the multiple bending angle ranges according to the first embodiment.

FIG. 16 is a view illustrating a state image of the wheel loader 1 which belongs to the first left bending angle range FRl1 in which the bending angle θ is greater than or equal to −20[°] and smaller than −5[°]. A median bending angle θ of the first left bending angle range FRl1 is −12.5[°]. As illustrated in FIG. 16, the state image of the wheel loader 1 which belongs to the first left bending angle range FRl1 indicates a state where the bending angle θ is −12.5[°].

Figure 17:
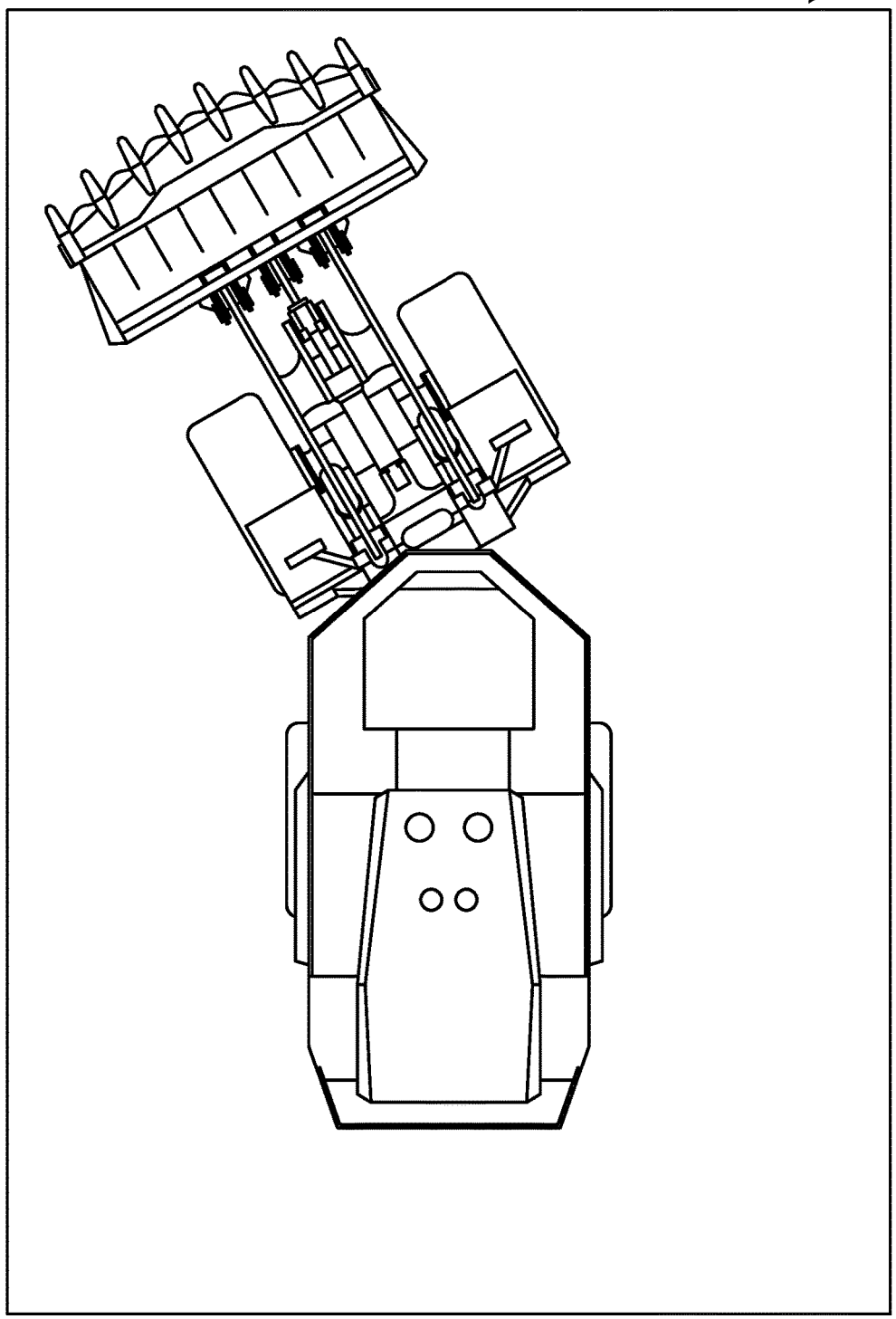
FIG. 17 is a view schematically illustrating an example of the representative images of the work vehicle which respectively belong to the multiple bending angle ranges according to the first embodiment.

FIG. 17 is a view illustrating a state image of the wheel loader 1 which belongs to the second left bending angle range FRl2 in which the bending angle θ is greater than or equal to −35[°] and smaller than −20[°]. A median bending angle θ of the second left bending angle range FRl2 is −27.5[°]. As illustrated in FIG. 17, the state image of the wheel loader 1 which belongs to the second left bending angle range FRl2 indicates a state where the bending angle θ is −27.5[°].

In the present embodiment, the representative images are defined, one for each of a right outer bending angle range FRro on a right side of +35[°], which is the first threshold bending angle θs1, and a left outer bending angle range FRlo on a left side of −35[°], which is the second threshold bending angle θs2. In the present embodiment, the right outer bending angle range FRro is a range in which the bending angle θ is greater than +35[°] (+35[°]<θ). The left outer bending angle range FRlo is a range in which the bending angle θ is smaller than −35[°] (θ<−35[°]).

Figure 18:
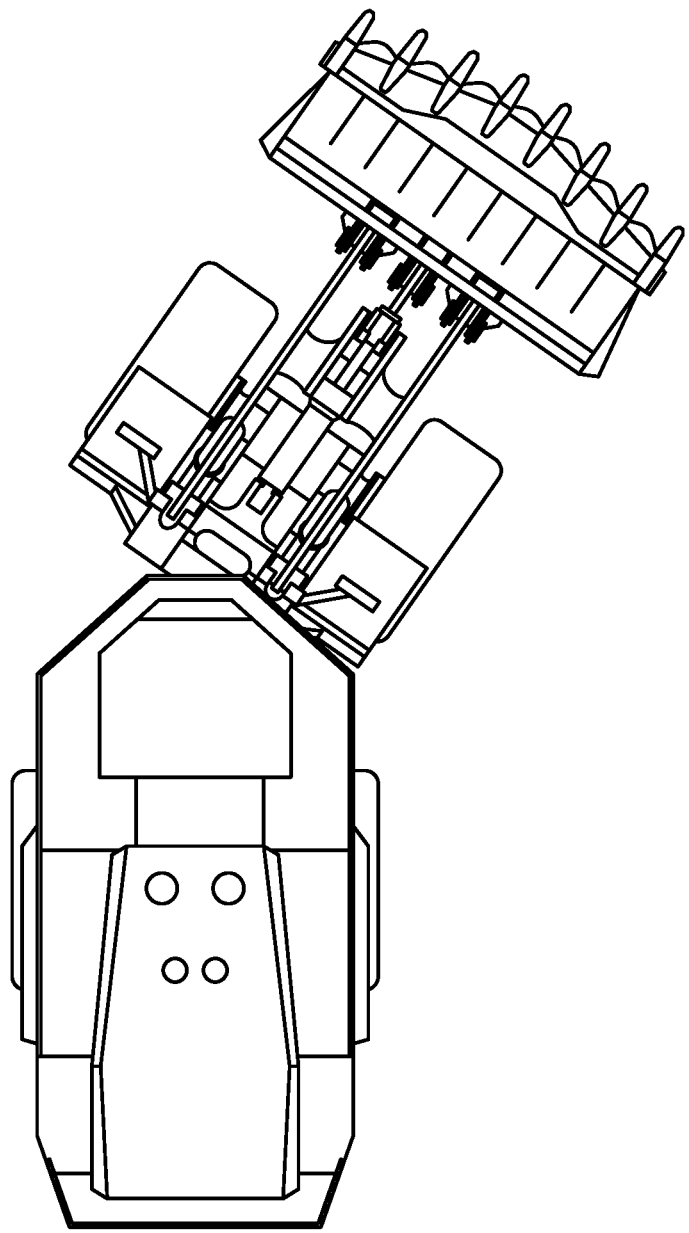
FIG. 18 is a view schematically illustrating an example of the representative images of the work vehicle which respectively belong to the multiple bending angle ranges according to the first embodiment.

FIG. 18 is a view illustrating a state image of the wheel loader 1 which belongs to the right outer bending angle range FRro in which the bending angle θ is greater than +35[°]. As illustrated in FIG. 18, in the state image of the wheel loader 1 which belongs to the right outer bending angle range FRro, the bending angle θ is, for example, +35[°]. It is sufficient for the bending angle θ in the state image of the wheel loader 1 which belongs to the right outer bending angle range FRro to be a constant value, and for example, a state may be indicated where the bending angle θ is +40[°].

Figure 19:
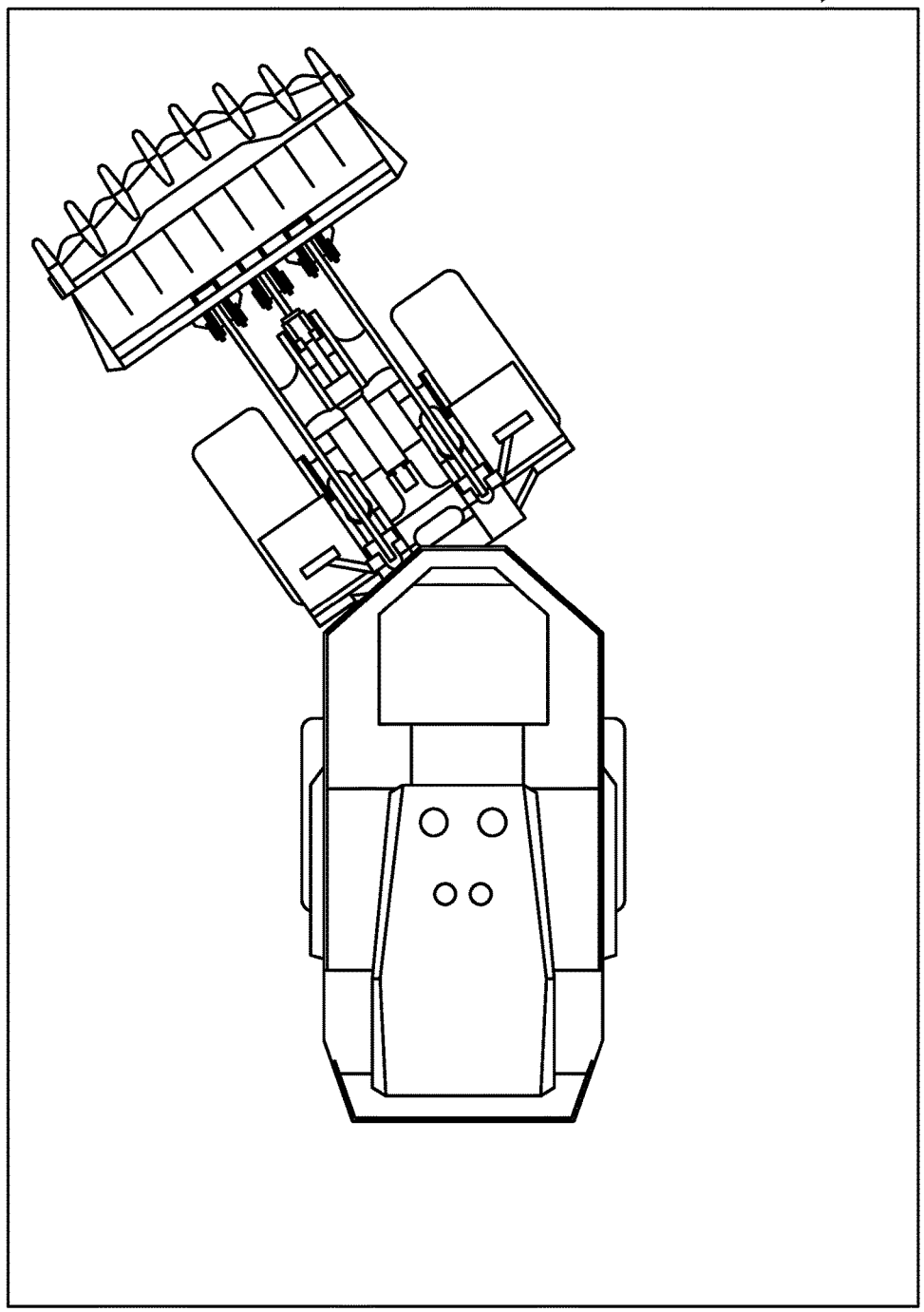
FIG. 19 is a view schematically illustrating an example of the representative images of the work vehicle which respectively belong to the multiple bending angle ranges according to the first embodiment.

FIG. 19 is a view illustrating a state image of the wheel loader 1 which belongs to the left outer bending angle range FRlo in which the bending angle θ is smaller than −35[°]. As illustrated in FIG. 19, in the state image of the wheel loader 1 which belongs to the left outer bending angle range FRlo, the bending angle θ is, for example, −35[°]. It is sufficient for the bending angle θ in the state image of the wheel loader 1 which belongs to the left outer bending angle range FRlo to be a constant value, and for example, a state may be indicated where the bending angle θ is −40[°].

As described above, in the present embodiment, the multiple bending angle ranges FR and the library image data indicating representative images of the wheel loader 1, one representative image being defined for each of the multiple bending angle ranges FR, such as those described with reference to FIGS. 13 to 19, are stored in the storage unit 87.

The determination unit 88 determines, from the multiple bending angle ranges FR stored in the storage unit 87, the bending angle range FR to which the bending angle θ acquired by the bending angle data acquisition unit 81 belongs. In other words, the determination unit 88 determines which bending angle range FR, among the multiple bending angle ranges FR stored in the storage unit 87, the bending angle θ of the wheel loader 1 detected by the angle sensor 50 belongs to. For example, when the bending angle θ of the wheel loader 1 detected by the angle sensor 50 is +15[°], the determination unit 88 determines that the bending angle θ belongs to the first right bending angle range FRr1. Alternatively, when the bending angle θ of the wheel loader 1 detected by the angle sensor 50 is −25[°], the determination unit 88 determines that the bending angle θ belongs to the second left bending angle range FRl2.

The selection unit 89 selects, from the plurality of representative images stored in the storage unit 87, a representative image which belongs to the bending angle range FR determined by the determination unit 88. For example, when the bending angle range FR determined by the determination unit 88 has been determined to be the first right bending angle range FRr1, the selection unit 89 selects, among the representative images stored in the storage unit 87, a representative image to which the first right bending angle range FRr1 belongs, such as that described with reference to FIG. 14. Alternatively, when the bending angle range FR determined by the determination unit 88 has been determined to be the second left bending angle range FRl2, the selection unit 89 selects, among the representative images stored in the storage unit 87, a representative image to which the second left bending angle range FRl2 belongs, such as that described with reference to FIG. 17.

The obstacle position data generation unit 90 generates obstacle position data indicating a position of an obstacle based on the obstacle data acquired by the obstacle data acquisition unit 83.

The display control unit 91 causes the display device 60 to simultaneously display the bird's eye image generated by the bird's eye image composition unit 84 and the representative image selected by the selection unit 89. In the present embodiment, the display control unit 91 causes the display device 60 to display the representative image selected by the selection unit 89 in a central portion of the display screen of the display device 60, and to display the bird's eye image around the representative image on the display screen of the display device 60.

The display control unit 91 causes the display device 60 to display a mark indicating a position of an obstacle based on the obstacle position data generated by the obstacle position data generation unit 90. The display control unit 91 causes the display device 60 to display the mark indicating a position of an obstacle in such a manner as to overlap the bird's eye image.

Figure 20:
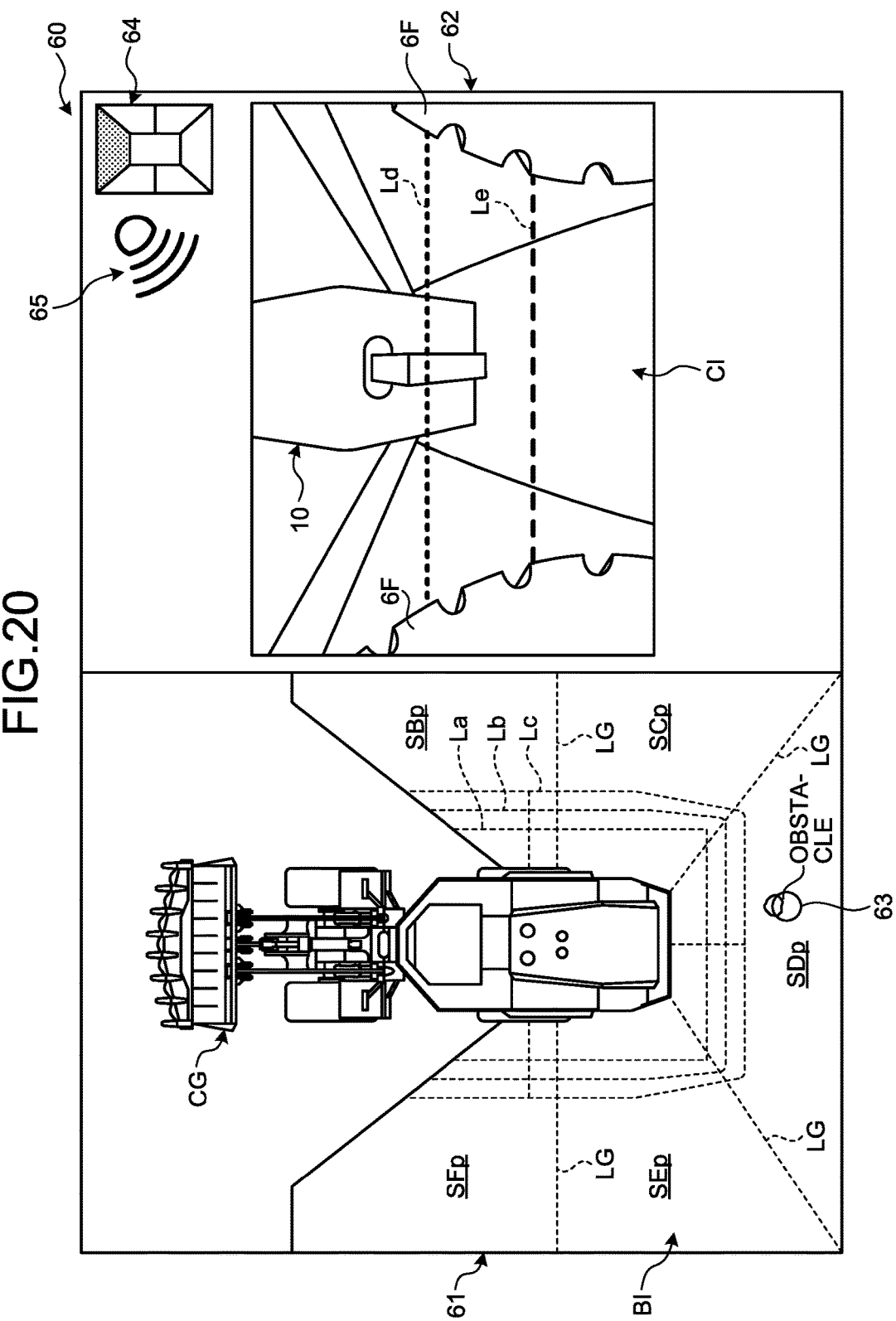
FIG. 20 is a view schematically illustrating an example of a display screen displayed on a display device according to the first embodiment.

FIG. 20 is a view schematically illustrating an example of a display screen displayed on the display device 60 according to the present embodiment. As illustrated in FIG. 20, in the present embodiment, the display control unit 91 causes the display device 60 to display a representative image CG and the bird's eye image BI in a first area 61 of the display screen of the display device 60, and to display a shot image in a second area 62 of the display screen adjacent to the first area 61.

FIG. 20 illustrates an example in which the bending angle θ of the wheel loader 1 detected by the angle sensor 50 is +3[°], the bending angle range FR to which the bending angle θ belongs has been determined to be the reference bending angle range FRc, and a representative image CG which belongs to the reference bending angle range FRc, such as that described with reference to FIG. 13, is displayed. The display control unit 91 causes the representative image CG which belongs to the reference bending angle range FRc to be displayed in a central portion of the first area 61, and the bird's eye image BI of the surroundings of the wheel loader 1 to be displayed around the representative image CG in the first area 61.

The display control unit 91 causes lines LG to be displayed on the bird's eye image BI in an overlapping manner. The lines LG indicate borders between respective shooting areas SBp, SCp, SDp, SEp, and SFp of the cameras 20B, 20C, 20D, 20E, and 20F which acquire shot image data for generating the bird's eye image BI. The shooting areas SBp, SCp, SDp, SEp, and SFp indicate image data corresponding to the actual shooting areas SBp, SCp, SDp, SEp, and SFp of the cameras 20B, 20C, 20D, 20E, and 20F, respectively.

The display control unit 91 causes lines La, Lb, and Lc indicating distance from an outer periphery of the wheel loader 1 to be displayed on the bird's eye image BI in an overlapping manner. The outer periphery of the wheel loader 1 is a line which forms an outer shape of the wheel loader 1 indicated in a planar view of the wheel loader 1 from a superior view when the wheel loader 1 is in an attitude which allows the wheel loader 1 to travel in a straight line. In the example illustrated in FIG. 20, the line La indicates a position at 3 [m] from the outer periphery of the wheel loader 1, the line Lb indicates a position at 5 [m] from the outer periphery of the wheel loader 1, and the line Lc indicates a position at 7 [m] from the outer periphery of the wheel loader 1. The distance indicated by each of the lines La, Lb, and Lc is by way of example only, and may be set arbitrarily. The number of lines which indicate distance from the outer periphery of the wheel loader 1 may not necessarily be three, and may be one or two, or arbitrary numbers of four or more.

The display control unit 91 causes a mark 63 indicating a position of an obstacle detected by the non-contact sensors 40 to be displayed on the bird's eye image BI in an overlapping manner. For example, when an obstacle present in a posterior area outside the wheel loader 1 is detected by the non-contact sensors 40, the display control unit 91 causes the mark 63 to be displayed on the obstacle displayed in the bird's eye image BI in an overlapping manner based on the obstacle position data indicating a position of the obstacle generated by the obstacle position data generation unit 90. Consequently, the presence of the obstacle is displayed with an emphasis, and thereby the operator of the wheel loader 1 can recognize the presence of the obstacle quickly. Here, the display control unit 91 may cause the mark 63 to be displayed in a blinking manner. In the present embodiment, the display control unit 91 causes, among the shooting areas SBp, SCp, SDp, SEp, and SFp, a shooting area where the obstacle is present to be highlighted. For example, the display control unit 91 can cause the shooting area where the obstacle is present (in FIG. 20, the shooting area SDp) to be displayed in a color different from that of other shooting areas where no obstacle is present, or to be displayed in a blinking manner. The display control unit 91 may cause a contour of the shooting area where the obstacle is present to be displayed in a blinking manner.

The shot image acquired by the shot image data acquisition unit 82 is displayed in the second area 62. FIG. 20 illustrates an example in which a shot image CI indicating an anterior area outside the wheel loader 1, which has been shot by the camera 20A and subjected to image processing in the front image generation unit 85, is displayed. Guide lines Ld and Le indicating predetermined sites of the wheel loader 1 are displayed in the second area 62. The lines La, Lb, and Lc, as well as the guide lines Ld and Le may be displayed in a display mode using a dashed line as illustrated in FIG. 20, or a display mode using a solid line. Alternatively, a display mode may be used in which the lines and the guide lines are displayed in different colors from each other.

In the present embodiment, when the wheel loader 1 is traveling forward, the display control unit 91 causes a shot image CI shot by the camera 20A and indicating an anterior area outside the wheel loader 1 to be displayed in the second area 62. On the other hand, when the wheel loader 1 is traveling backward, the display control unit 91 causes a shot image CI shot by the camera 20D and indicating a posterior area outside the wheel loader 1 to be displayed in the second area 62.

In the present embodiment, the operation signal of the forward/backward switch of the driving operation device 52 is input to the camera image switching unit 86. The camera image switching unit 86 outputs, to the display control unit 91, command data for switching shot images CI to be displayed in the second area 62 based on the operation signal output from the driving operation device 52. When the wheel loader 1 is traveling forward, and command data for displaying a shot image CI of an anterior area outside the wheel loader 1 is acquired from the camera image switching unit 86, the display control unit 91 causes the shot image CI shot by the camera 20A to be displayed in the second area 62. When the wheel loader 1 is traveling backward, and command data for displaying a shot image CI of a posterior area outside the wheel loader 1 is acquired from the camera image switching unit 86, the display control unit 91 causes the shot image CI shot by the camera 20D to be displayed in the second area 62.

In addition, an indicator 64 is displayed in the second area 62. The indicator 64 indicates, among the respective shooting areas of the cameras 20, a shooting area of the camera 20 displayed in the second area 62. Further, an icon 65 which indicates that the non-contact sensors 40 are in operation is displayed in the second area 62.

The display control unit 91 may cause the display device 60 to display, not the second area 62, but a representative image CG selected by the selection unit 89 in the central portion of the display screen of the display device 60, and to display the bird's eye image BI around the representative image CG on the display screen of the display device 60. Alternatively, the display control unit 91 may cause the display device 60 to display, not the first area 61, but a shot image CI selected by the selection unit 89 in the central portion of the display screen of the display device 60. In other words, the display control unit 91 may cause the display device 60 to perform so-called two-screen display, or one-screen display.

Figure 21:
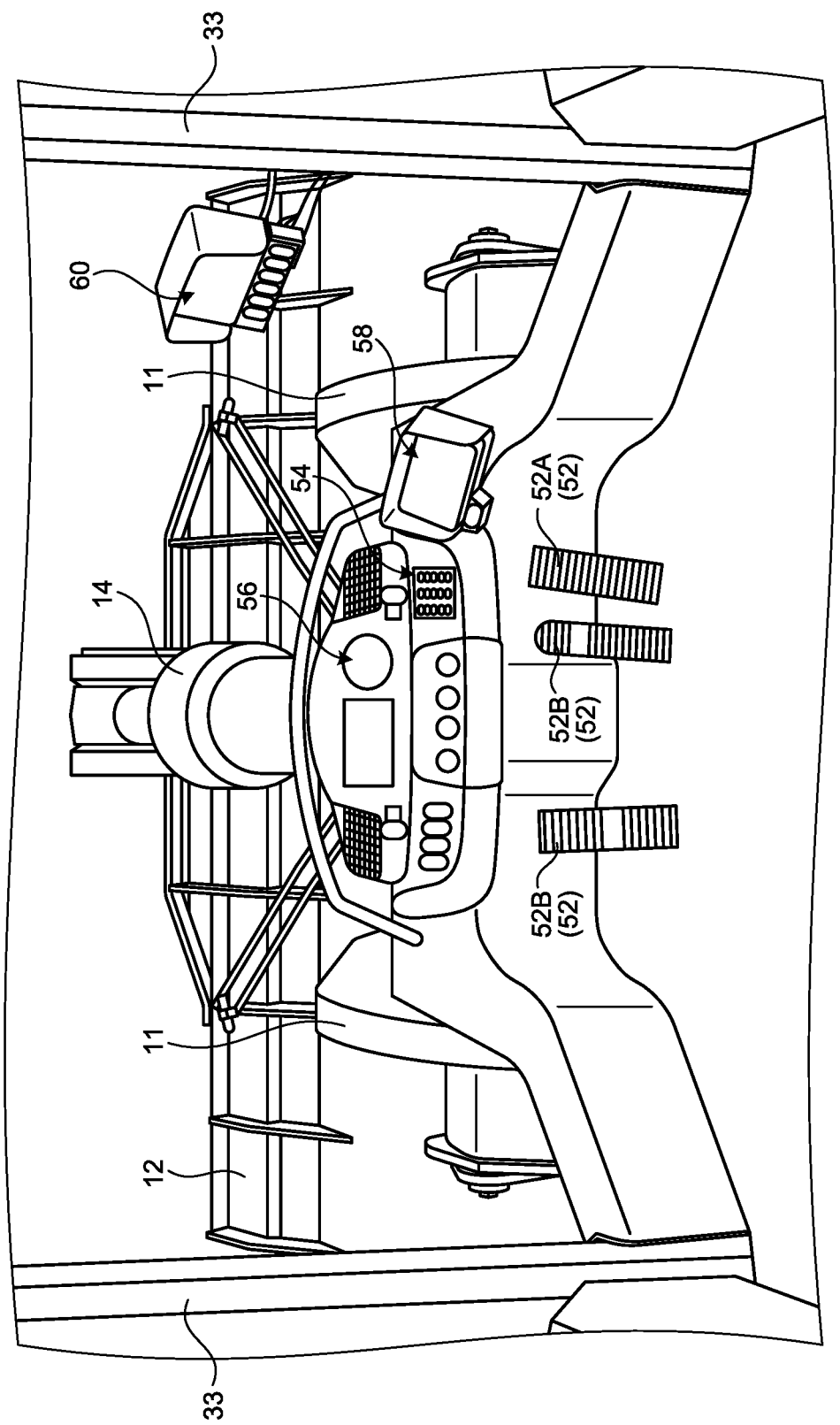
FIG. 21 is a view schematically illustrating an example of an operator's cabin according to the first embodiment.

FIG. 21 is a view schematically illustrating an example of the operator's cabin on the operation platform 3 according to the present embodiment. FIG. 21 schematically illustrates a scene viewed by the operator sitting on the operator's seat in the operator's cabin.

The display device 60 is arranged in the operator's cabin of the vehicle body 2. The operator can take a look at the display device 60 provided in the operator's cabin to check surrounding conditions of the wheel loader 1.

A plurality of devices is provided in the operator's cabin. Examples of the devices include an accelerator pedal 52A and left and right brake pedals 52B, which are included in the driving operation device 52, an instrument 54, a monitor device 56, and a rear-view monitor device 58. A windshield is provided at a front portion of the operator's cabin. The windshield is supported by pillars 33 of the operator's cabin. The display device 60 is supported by the pillar 33. Since the display device 60 is supported by the pillar 33, the operator can visually observe outside circumstances through the windshield without being shielded by the display device 60.

Although the operator in the operator's cabin can visually observe the boom 11, the bucket cylinder 14, and the like, through the windshield in the wheel loader 1 as illustrated in FIG. 21, it is difficult to visually observe surrounding conditions of the wheel loader 1 including the ground surface RS.

In the present embodiment, shot image data of the surroundings of the wheel loader 1 is acquired by the cameras 20 and displayed on the display device 60. An obstacle present in the surroundings of the wheel loader 1 is detected by the non-contact sensors 40, and displayed on the display device 60. Consequently, the operator can smoothly grasp surrounding conditions of the wheel loader 1.

[Surroundings Monitoring Method]

Figure 22:
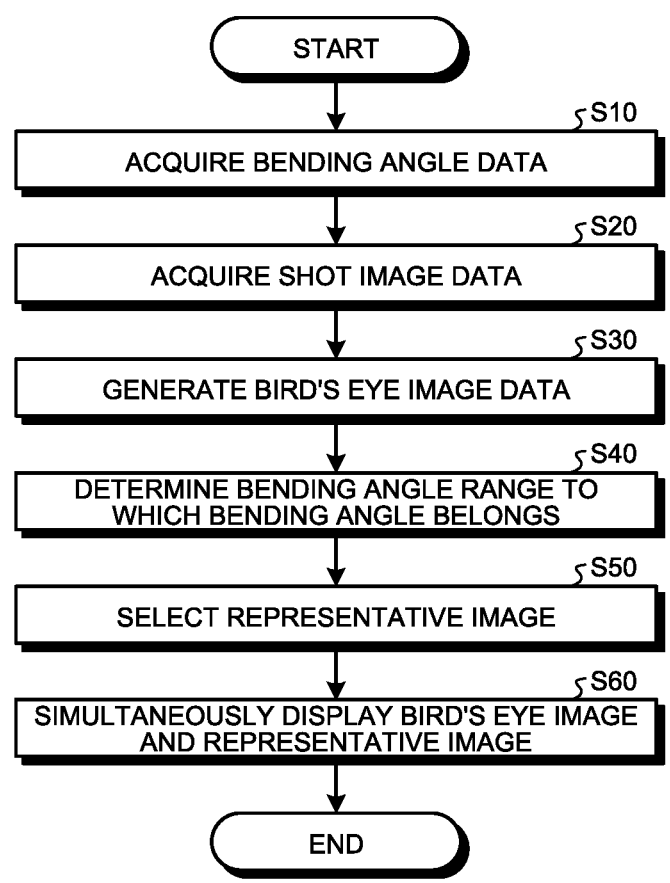
FIG. 22 is a flowchart illustrating an example of a surroundings monitoring method for a work vehicle according to the first embodiment.

Next, a surroundings monitoring method for a work vehicle according to the present embodiment will be described. FIG. 22 is a flowchart illustrating an example of the surroundings monitoring method for a work vehicle according to the present embodiment.

For example, when using the wheel loader 1 to load excavated material into a vessel of a transport vehicle, the operator causes the wheel loader 1 to travel forward to the transport vehicle with the excavated material retained in the bucket 12.

The bending angle data acquisition unit 81 acquires bending angle data which indicates a bending angle θ between the vehicle body front portion 2F and the vehicle body rear portion 2R detected by the angle sensor 50 (Step S10).

The shot image data acquisition unit 82 acquires shot image data indicating shot images CI respectively shot by the cameras 20 (Step S20).

The bird's eye image composition unit 84 performs image processing of the plurality of shot image data acquired by the cameras 20B, 20C, 20D, 20E, and 20F to generate bird's eye image data indicating a bird's eye image BI of the surroundings of the wheel loader 1 (Step S30).

The determination unit 88 determines, from the multiple bending angle ranges FR stored in the storage unit 87, a bending angle range FR to which the bending angle θ of the wheel loader 1 belongs based on the bending angle data acquired in Step S10 (Step S40).

The selection unit 89 selects, from the plurality of the representative images CG stored in the storage unit 87, a representative image CG which belongs to the bending angle range FR determined in Step S40 (Step S50).

The display control unit 91 causes the display device 60 mounted in the operator's cabin of the wheel loader 1 to simultaneously display the bird's eye image BI generated in Step S30 and the representative image CG selected in Step S50 on the same display screen in the first area 61 of the display device 60 (Step S60). In the surroundings monitoring method for a work vehicle, Steps S20 and S30 may be performed prior to the execution of Step S10. In other words, the process for generating the bird's eye image BI may be performed prior to the execution of the process for selecting the representative image CG, or respective processes may be executed in reverse order.

For example, when the bending angle θ is −5[°] to +5[°], the representative image CG described with reference to FIG. 13 is selected and displayed in the first area 61. When the bending angle θ is greater than +5[°] and smaller than or equal to +20[°], the representative image CG described with reference to FIG. 14 is selected and displayed in the first area 61. When the bending angle θ is greater than +20[°] and smaller than or equal to +35[°], the representative image CG described with reference to FIG. 15 is selected and displayed in the first area 61. When the bending angle θ is greater than or equal to −20[°] and smaller than −5[°], the representative image CG described with reference to FIG. 16 is selected and displayed in the first area 61. When the bending angle θ is greater than or equal to −35[°] and smaller than −20[°], the representative image CG described with reference to FIG. 17 is selected and displayed in the first area 61. When the bending angle θ is greater than +35[°], the representative image CG described with reference to FIG. 18 is selected and displayed in the first area 61. When the bending angle θ is smaller than −35[°], the representative image CG described with reference to FIG. 19 is selected and displayed in the first area 61.

In forward traveling of the wheel loader 1, shot image data acquired by the camera 20A is displayed in the second area 62 of the display device 60.

The operator operates an operation lever to load the excavated material retained in the bucket 12 into the vessel of the transport vehicle, and then operates the forward/backward switch to cause the wheel loader 1 to travel backward. Consequently, the wheel loader 1 travels away from the transport vehicle. In backward traveling of the wheel loader 1, shot image data acquired by the camera 20D is displayed in the second area 62 of the display device 60.

Also in backward traveling of the wheel loader 1, the bending angle data acquisition unit 81 acquires bending angle data from the angle sensor 50. Also in backward traveling of the wheel loader 1, a bird's eye image BI of the surroundings of the wheel loader 1 is generated, a bending angle range FR to which the bending angle θ belongs is determined, a representative image CG which belongs to the determined bending angle range FR is selected, and the generated bird's eye image BI and the selected representative image CG are displayed on the display device 60 simultaneously.

For example, in a case where an obstacle present in a lateral area (right or left area) outside the wheel loader 1 is detected by the non-contact sensors 40 in backward traveling of the wheel loader 1, the display control unit 91 causes the display device 60 to display shot image data of the shooting area where the obstacle is present based on the obstacle position data indicating a position of the obstacle generated by the obstacle position data generation unit 90. For example, in a case where the non-contact sensor 40A detects that an obstacle is present in the shooting area SB of the camera 20B in backward traveling of the wheel loader 1, the display control unit 91 switches shot image data being displayed on the second area 62 from shot image data acquired by the camera 20D to shot image data acquired by the camera 20B. Consequently, the operator can visually observe condition of the obstacle and relative positions of the obstacle and the wheel loader 1.

[Effects]

As described above, according to the present embodiment, since the library image data indicating representative images CG of the wheel loader 1 which respectively belong to the multiple bending angle ranges FR is generated in advance, and a representative image CG is selected in accordance with the actual bending angle $\theta$ of the wheel loader 1 and displayed on the display device 60, it is possible to let the operator to recognize the bent state of the wheel loader 1 without increasing a load of image processing. In addition, since the bird's eye image BI is displayed with the representative image CG indicating the bent state of the wheel loader 1, the operator can sufficiently grasp surrounding conditions of the wheel loader 1. Furthermore, since the representative image CG indicates the bent state of the wheel loader 1, the operator can recognize which direction the wheel loader 1 is about to travel. In a case where an obstacle is present in surroundings of the wheel loader 1, the operator can accurately recognize relative positions of the wheel loader 1 and the obstacle and whether the obstacle interferes the wheel loader 1 in a planned traveling direction thereof.

According to the present embodiment, an image of the wheel loader 1 which the display device 60 is caused to display is not changed each time when a bending angle $\theta$ of the wheel loader 1 is changed. Instead thereof, bending angles $\theta$ are grouped into defined bending angle ranges FR and the display device 60 is caused to display a representative image CG representative of the group. Consequently, a load of image processing is reduced. In addition, it is less likely that an image displayed on the display device 60 flickers, and deterioration of visibility is suppressed. Therefore, it is possible to let the operator accurately recognize at least a planned traveling direction of the wheel loader 1 while suppressing an increase in cost.

According to the present embodiment, the bird's eye image BI is displayed around the selected representative image CG. Consequently, the operator can recognize surrounding conditions of the wheel loader 1 employing the wheel loader 1 as reference.

According to the present embodiment, the representative image CG and the bird's eye image BI are displayed in the first area 61 of the display device 60, and a shot image CI by the camera 20 is displayed in the second area 62 adjacent to the first area 61. Consequently, the operator can acquire information regarding surrounding conditions from both of the bird's eye image BI and the shot image CI by the camera 20.

In the present embodiment, for example, when the wheel loader 1 is traveling forward, a shot image CI acquired by the camera 20A is displayed in the second area 62. Since the representative image CG indicating the bent state of the wheel loader 1 is displayed in the first area 61, the operator can intuitively recognize a direction which the vehicle body front portion 2F including the camera 20A mounted thereon faces, by seeing the representative image CG in the first area 61. Accordingly, the operator can intuitively recognize a direction of the shot image CI by the camera 20A displayed in the second area 62.

In the present embodiment, the multiple bending angle ranges FR are defined between the first threshold bending angle $\theta s1$ on the right side and the second threshold bending angle $\theta s2$ on the left side so as not to overlap with each other, and the representative images CG are defined, one for each of the multiple bending angle ranges FR. Consequently, a load of image processing is sufficiently reduced and flickering of an image displayed on the display device 60 is sufficiently suppressed.

According to the present embodiment, the representative images CG include a state image which indicates the wheel loader 1 of which the vehicle body front portion 2F bends by a bending angle $\theta$, which is a median of a bending angle range FR. By setting the bending angle $\theta$ of the state image to be the median of the bending angle range FR, the operator can intuitively recognize a bent state of the wheel loader 1 by seeing the state image.

According to the present embodiment, the bending angle ranges FR include the reference bending angle range FRc including a bending angle $\theta$ of zero degrees, a plurality of right bending angle ranges FRr1 and FRr2 on the right side of the reference bending angle range FRc, and a plurality of left bending angle ranges FRl1 and FRl2 on the left side of the reference bending angle range FRc. An absolute value of the bending angle $\theta a1$ which defines the right end of the reference bending angle range FRc and an absolute value of the bending angle $\theta a2$ which defines the left end thereof are equal. In addition, a size of the first right bending angle range FRr1, a size of the second right bending angle range FRr2, a size of the first left bending angle range FRl1, and a size of the second left bending angle range FRl2 are equal. Consequently, the operator can intuitively recognize a bent state of the wheel loader 1 by seeing the representative image CG which indicates bending based on the multiple bending angle ranges FR.

According to the present embodiment, the representative images CG are defined, one for each of the right outer bending angle range FRro on the right side of the first threshold bending angle $\theta s1$, and the left outer bending angle range FRlo on the left side of the second threshold bending angle $\theta s2$. When the wheel loader 1 is bent more greatly than the first threshold bending angle $\theta s1$, or when the wheel loader 1 is bent more greatly than the second threshold bending angle $\theta s2$, not the plurality of representative images CG but one representative image CG is displayed. Therefore, a load of image processing is sufficiently reduced and flickering of an image displayed on the display device 60 is sufficiently suppressed.

Second Embodiment

A second embodiment will be described. In the following description, components which are same as or similar to those in the above embodiment are denoted by the same reference signs, and descriptions thereof will be simplified or omitted.

In the first embodiment described above, it has been assumed that the driving operation device 52, the display device 60, and the control device 80 are mounted on the wheel loader 1. The driving operation device 52 and the display device 60 may be provided in a remote location from the wheel loader 1. A part or whole of a plurality of functions of the control device 80 may be provided in the remote location from the wheel loader 1.

FIG. 23 is a view schematically illustrating an example of a wheel loader 1 according to the present embodiment. In the present embodiment, the wheel loader 1 is remotely controlled by a driving operation device 52F provided in the remote location from the wheel loader 1.

Similarly to the embodiment described above, the wheel loader 1 includes at least a vehicle body front portion 2F, a vehicle body rear portion 2R, a joint mechanism 9 which bendably couples the vehicle body front portion 2F and the vehicle body rear portion 2R, and a camera 20 mounted on a vehicle body 2.

A display device 60F, an input device 70F, a control device 80F, and the driving operation device 52F are arranged in a remote control facility provided in the remote location from the wheel loader 1. Each of the display device 60F, the input device 70F, the control device 80F, and the driving operation device 52F is provided separately from the wheel loader 1.

The wheel loader 1 and the control device 80F wirelessly communicate with each other via a wireless communication system. The wheel loader 1 is provided with a wireless communication instrument 201 of the wireless communication system, and a wireless communication instrument 202 of the wireless communication system is connected to the control device 80F.

The driving operation device 52F includes, for example, an accelerator pedal, a brake pedal, a shift lever, a steering lever for swinging and steering the wheel loader 1, a forward/backward switch for performing switching between forward traveling and backward traveling of the wheel loader 1, and an operation lever for operating a working implement 10. An operator operates the driving operation device 52F in the remote control facility. An operation signal generated by the driving operation device 52F being operated is transmitted to the wheel loader 1 via the wireless communication system. Consequently, the wheel loader 1 is remotely controlled, and adjustment of a travel speed, switching between forward traveling and backward traveling, and swing of the wheel loader 1, and an operation of the working implement 10 are performed.

The control device 80F includes a bending angle data acquisition unit 81, a shot image data acquisition unit 82, an obstacle data acquisition unit 83, a bird's eye image composition unit 84, a front image generation unit 85, a camera image switching unit 86, a storage unit 87, a determination unit 88, a selection unit 89, an obstacle position data generation unit 90, and a display control unit 91, such as those described with reference to FIG. 11.

A shot image shot by the camera 20 provided in the wheel loader 1 is transmitted to the control device 80F from the wheel loader 1 via the wireless communication system. The display control unit 91 of the control device 80F causes the display device 60F to display the shot image shot by the camera 20 and transmitted from the wheel loader 1 via the wireless communication system and a selected representative image CG in a superimposed manner. The operator in the remote control facility can visually observe the display data displayed on the display device 60F.

As described above, the wheel loader 1 may be remotely controlled via the wireless communication system. The operator operates the driving operation device 52F in the remote location. The operation signal of the driving operation device 52F is transmitted to the wheel loader 1 via the wireless communication system. The wheel loader 1 can perform adjustment of a traveling speed, switching between forward traveling and backward traveling, swing, and an operation of the working implement 10 based on the operation signal of the driving operation device 52F. When the control device 80F is provided in the remote location, bending angle data acquired by the angle sensor 50, obstacle data acquired by a non-contact sensor 40 and shot image data acquired by the camera 20 are transmitted to the control device 80F in the remote location via the wireless communication system. The control device 80F can cause the display device 60F provided in the remote location to display a representative image CG and a bird's eye image BI based on the received bending angle data and shot image data. In addition, the control device 80F can cause the display device 60F to display a mark 63 indicating an obstacle based on the received obstacle data.

In the embodiments described above, it has been assumed that the bending angle data acquisition unit 81 acquires bending angle data from the angle sensor 50 provided on the pin member of the joint mechanism 9. The bending angle data acquisition unit 81 may acquire, for example, an operation amount of the steering lever for steering the wheel loader 1 to calculate the bending angle data. The joint mechanism 9 includes a hydraulic cylinder which generates power to bend the vehicle body front portion 2F. The bending angle data acquisition unit 81 may acquire a stroke amount of the hydraulic cylinder of the joint mechanism 9 to calculate the bending angle data.

In the embodiments described above, it has been assumed that the bucket 12, which is a kind of working member, is coupled to the distal end of the boom 11. The working member coupled to the distal end of the boom 11 may be a blade with a blade edge.

In the embodiments described above, it has been assumed that the wheel loader 1 operates in a mining site. The wheel loader 1 may be used in a working site or a construction site, or may be used for snow removal operations, for operations in the agricultural and livestock industries, or for operations in the forestry industry. The working member coupled to the distal end of the boom 11 may be a snow plow or a snow bucket used for snow removal operations, a bale grab or a fork used for operations in the agricultural and livestock industries, or a fork or a bucket used for operations in the forestry industry.

In the embodiments described above, it has been assumed that the work vehicle 1 is a wheel loader. The work vehicle 1 may be an articulated dump truck which includes a vehicle body front portion, a vehicle body rear portion, and a joint mechanism which bendably couples the vehicle body front portion and the vehicle body rear portion.

REFERENCE SIGNS LIST

1 WHEEL LOADER (WORK VEHICLE)
2 VEHICLE BODY
2F VEHICLE BODY FRONT PORTION
2R VEHICLE BODY REAR PORTION
3 OPERATION PLATFORM
4 TRAVELING DEVICE
5 WHEEL
5F FRONT WHEEL
5R REAR WHEEL
6 TIRE
6F FRONT TIRE
6R REAR TIRE
7 POWER TRANSMISSION MECHANISM

8 HOUSING
8B AXLE BALL
9 JOINT MECHANISM
10 WORKING IMPLEMENT
11 BOOM
12 BUCKET
12B DISTAL END
12E END
13 BOOM CYLINDER
14 BUCKET CYLINDER
15 BELL CRANK
16 LINK
20 CAMERA
20A, 20B, 20C, 20D, 20E, 20F CAMERA
30 ILLUMINATION DEVICE
31 CASING
31L ROD MEMBER
32 COVER MEMBER
33 PILLAR
40 NON-CONTACT SENSOR (RADAR DEVICE)
40A, 40B, 40C, 40D NON-CONTACT SENSOR (RADAR DEVICE)
50 ANGLE SENSOR (DETECTOR)
52 DRIVING OPERATION DEVICE
52A ACCELERATOR PEDAL
52B BRAKE PEDAL
54 INSTRUMENT
56 MONITOR DEVICE
58 REAR-VIEW MONITOR DEVICE
60 DISPLAY DEVICE
61 FIRST AREA
62 SECOND AREA
63 MARK
64 INDICATOR
65 ICON
70 INPUT DEVICE
80 CONTROL DEVICE
81 BENDING ANGLE DATA ACQUISITION UNIT
82 SHOT IMAGE DATA ACQUISITION UNIT
83 OBSTACLE DATA ACQUISITION UNIT
84 BIRD'S EYE IMAGE COMPOSITION UNIT
85 FRONT IMAGE GENERATION UNIT
86 CAMERA IMAGE SWITCHING UNIT
87 STORAGE UNIT
88 DETERMINATION UNIT
89 SELECTION UNIT
90 OBSTACLE POSITION DATA GENERATION UNIT
91 DISPLAY CONTROL UNIT
100 SURROUNDINGS MONITORING SYSTEM
La, Lb, Lc LINE
Ld, Le GUIDE LINE
LG LINE
RS GROUND SURFACE

The invention claimed is:

1. A surroundings monitoring system for a work vehicle that comprises a vehicle body front portion, a vehicle body rear portion, and a joint mechanism that bendably couples the vehicle body front portion and the vehicle body rear portion, the surroundings monitoring system for a work vehicle comprising:
a bending angle data acquisition unit that acquires bending angle data that indicates a bending angle between the vehicle body front portion and the vehicle body rear portion detected by a detector mounted on the work vehicle;
a shot image data acquisition unit that acquires shot images respectively shot by multiple cameras mounted on the work vehicle including a camera which shoots an image of a ground surface between a bucket and front tires of the vehicle body such that ends on both sides of the bucket and front portions of the front tires are included in a shot image in a state where a lowering operation of a bucket boom has been performed so as to bring the bucket into contact with the ground surface;
a bird's eye image composition unit that performs image processing of a plurality of the shot image data to generate a bird's eye image of surroundings of the work vehicle;
a storage unit that stores representative images of the work vehicle respectively belong to multiple bending angle ranges between the vehicle body front portion and the vehicle body rear portion;
a determination unit that determines, from the multiple bending angle ranges, a bending angle range to which the bending angle belongs;
a selection unit that selects, from a plurality of the representative images, a representative image that belongs to the bending angle range determined by the determination unit; and
a display control unit that causes a display device to simultaneously display the bird's eye image generated by the bird's eye image composition unit and the representative image selected by the selection unit,
wherein
the vehicle body front portion bends leftward and rightward with respect to the vehicle body rear portion,
the multiple bending angle ranges are defined between a first threshold bending angle on a right side and a second threshold bending angle on a left side so as not to overlap with each other, and
the representative images are defined, one for each of the multiple bending angle ranges.

2. The surroundings monitoring system for a work vehicle according to claim 1, wherein the display control unit causes the display device to display the representative image selected by the selection unit in a central portion of a display screen of the display device, and to display the bird's eye image around the representative image on the display screen.

3. The surroundings monitoring system for a work vehicle according to claim 1, wherein the display control unit causes the representative image and the bird's eye image to be displayed in a first area of the display screen, and causes the shot image to be displayed in a second area of the display screen adjacent to the first area.

4. The surroundings monitoring system for a work vehicle according to claim 1, wherein the representative image indicates a state of the work vehicle of which the vehicle body front portion bends by the bending angle that is a median of the bending angle range.

5. The surroundings monitoring system for a work vehicle according to claim 1, wherein
the bending angle ranges include a reference bending angle range including a bending angle of a zero degree, a plurality of right bending angle ranges on a right side of the reference bending angle range, and a plurality of left bending angle ranges on a left side of the reference bending angle range,
a bending angle that defines a right end of the reference bending angle range and a bending angle that defines a left end thereof are equal, and
a size of the plurality of right bending angle ranges and a size of the plurality of left bending angle ranges are equal.

6. The surroundings monitoring system for a work vehicle according to claim 1, wherein the representative images are defined, one for each of a right outer bending angle range on a right side of the first threshold bending angle, and a left outer bending angle range on a left side of the second threshold bending angle.

7. The surroundings monitoring system for a work vehicle according to claim 1, wherein
   the display device is provided separately from the work vehicle, and
   the shot image shot by the camera and transmitted from the work vehicle via a wireless communication system and the selected representative image are simultaneously displayed on the display device.

8. A work vehicle comprising the surroundings monitoring system for a work vehicle according to claim 1.

* * * * *